(12) United States Patent  
Cowin

(10) Patent No.: US 8,276,311 B2  
(45) Date of Patent: *Oct. 2, 2012

(54) COMPOSITIONS AND METHODS FOR ENGAGING LINES

(75) Inventor: Clifton J. Cowin, Woodinville, WA (US)

(73) Assignee: Dream Waters, Inc., Woodinville, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/306,247

(22) PCT Filed: Jun. 25, 2007

(86) PCT No.: PCT/US2007/072057  
§ 371 (c)(1),  
(2), (4) Date: Dec. 31, 2009

(87) PCT Pub. No.: WO2007/150076  
PCT Pub. Date: Dec. 27, 2007

(65) Prior Publication Data  
US 2010/0107470 A1 May 6, 2010

Related U.S. Application Data

(60) Provisional application No. 60/815,926, filed on Jun. 24, 2006, provisional application No. 60/876,615, filed on Dec. 22, 2006.

(51) Int. Cl.  
*A01K 93/00* (2006.01)  
*A01K 93/02* (2006.01)
(52) U.S. Cl. .................. 43/44.91; 43/44.87; 43/44.9
(58) Field of Classification Search .......... 43/44.87, 43/44.88, 44.9, 44.91, 44.92, 44.95  
See application file for complete search history.

(56) References Cited

U.S. PATENT DOCUMENTS 2,393,070 A 1/1946 Saloun  
(Continued)

FOREIGN PATENT DOCUMENTS

WO WO 2007/002617 1/2007  
(Continued)

OTHER PUBLICATIONS

U.S. Appl. No. 60/815,926, filed Jun. 24, 2006, Cowin.

(Continued)

*Primary Examiner* — David Parsley  
(74) *Attorney, Agent, or Firm* — Barry L. Davison; Davis Wright Tremaine LLP

(57) ABSTRACT

Particular aspects provide devices and methods for adjustably and reversibly engaging a line (e.g., fishing lines, ropes, string, cable, wire, cords) at an engagement position and/or for demarcating positions/spans along a line. The inventive line-stop members are reversibly disengagable, and thereby slidably adjustable and positionable along a line, and can be used to define a user-selectable range or span. Particular embodiments comprise: an elongated line-clamping member having at least one pair of line-clamping arms and having a longitudinal axial bore suitable to allow slidable passage of a line therethrough; and a cylindrical engagement collar having a collar channel therethrough and slidably positionable along the line-clamping member, and suitable and positionable to reversibly hold the line-clamping member in a line-clamping/engagement position, and suitable and positionable to reversibly disengage the line-clamping member from the line-clamping position to reversibly disengage a line. Preferred line-stop embodiments comprise an accessory attachment member or collar.

13 Claims, 19 Drawing Sheets

U.S. PATENT DOCUMENTS

| | | | |
|---|---|---|---|
| 2,474,498 A * | 6/1949 | Schwabe | 43/44.91 |
| 2,483,788 A | 10/1949 | Smith | |
| 2,587,311 A * | 2/1952 | Golnick | 43/44.93 |
| 2,831,288 A * | 4/1958 | Killebrew | 43/43.11 |
| 2,890,510 A * | 6/1959 | Spalding | 403/211 |
| 3,019,546 A * | 2/1962 | Hansen | 43/44.91 |
| 3,124,892 A | 3/1964 | O'Brien | |
| 3,800,459 A | 4/1974 | Fleischaker | |
| 4,235,037 A | 11/1980 | Sivertsen | |
| 4,359,836 A | 11/1982 | Yuji | |
| 4,472,903 A * | 9/1984 | Hutson | 43/44.91 |
| 4,644,681 A | 2/1987 | Hutson | |
| 4,696,125 A | 9/1987 | Rayburn | |
| 4,845,884 A | 7/1989 | Pacitti | |
| 4,977,700 A | 12/1990 | Perlman | |
| 4,986,023 A | 1/1991 | Bucholz | |
| 5,031,351 A | 7/1991 | Rogel | |
| 5,161,324 A | 11/1992 | Dorsey | |
| 5,456,041 A | 10/1995 | Schoeberlein | |
| 6,073,386 A | 6/2000 | Firmin | |
| 7,610,715 B2 | 11/2009 | Cowin | |
| 2010/0037507 A1 | 2/2010 | Cowin | |

FOREIGN PATENT DOCUMENTS

WO    WO 2007/150076    12/2007

OTHER PUBLICATIONS

U.S. Appl. No. 60/876,615, filed Dec. 22, 2006, Cowin.

* cited by examiner

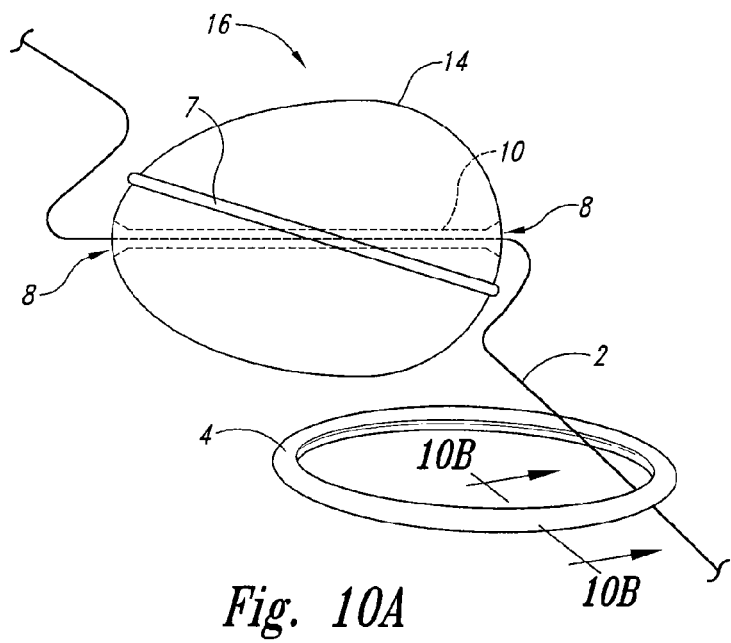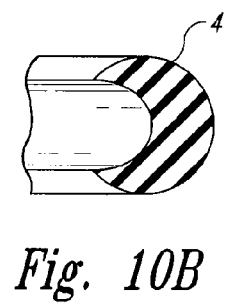
*Fig. 10A*  *Fig. 10B*
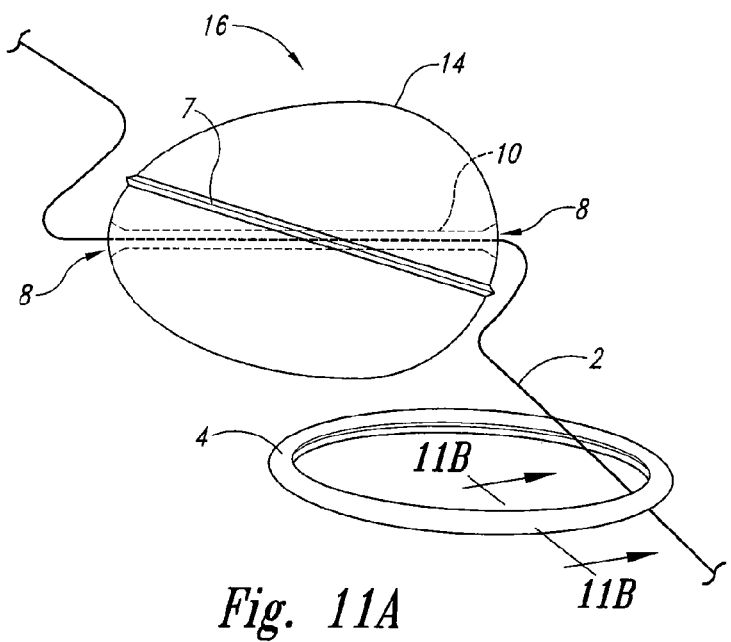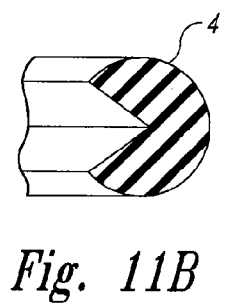
*Fig. 11A*  *Fig. 11B*

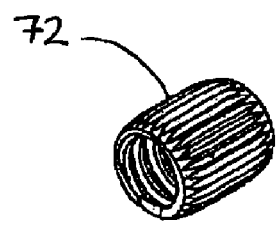
FIG. 17K
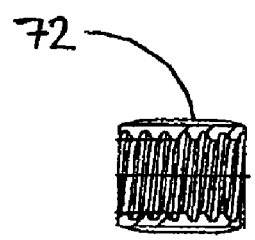 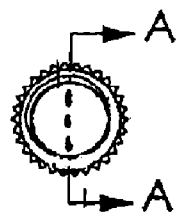
SECTION A-A
FIG. 17L
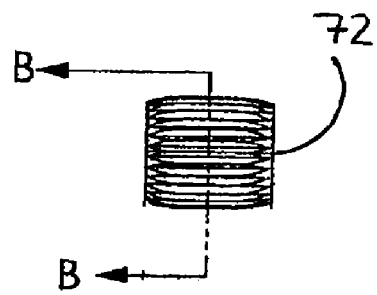 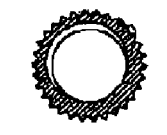
SECTION B-B
FIG. 17M

COMPOSITIONS AND METHODS FOR ENGAGING LINES

CROSS REFERENCE TO RELATED APPLICATIONS

The present application claims the benefit of priority to U.S. Provisional Patent Application Ser. Nos., 60/815,926 filed 24 Jun. 2006, and 60/876,615, filed 22 Dec. 2006, both entitled COMPOSITIONS AND METHODS FOR ENGAGING LINES, and both incorporated by reference herein in their entirety.

FIELD OF THE INVENTION

Aspects of the present invention relate generally to lines (e.g., ropes, string, cable, wire, cords, fishing lines, etc), and more particularly to novel line engaging (e.g. line clamping, pinching, attaching, etc.) members and devices, and methods for adjustably and reversibly engaging a line at an engagement position and/or for demarcating one or more positions and/or spans along a line, for appending additional elements to the line and for joining another line to the line via attachment of sad additional element or line to the engaging (e.g. line clamping, pinching, attaching, etc.) members and devices.

BACKGROUND

Strike indicators for fishing, including fly fishing and non-fly fishing, are known in the art. Typically, strike indicators are comprised of a buoyant material, and are large enough, and/or of suitable character (e.g., color, fluorescence, etc.), to be viewable at a operational distance by a fisherperson monitoring the indicator. Buoyant strike indicators, in operation, are designed to attachable to a fishing line, and thereby serve to suspend the line, with one or more attached fishing hooks or members at the end thereof, at a distance under the water corresponding to the length of line between the hook member and the strike indicator attachment point. When a fish strikes the suspended hook(s), the strike indicator is correspondingly displaced at the surface, thereby signaling the fisherperson to respond, typically by 'setting' the hook into the fish using appropriate rod/line action. Therefore, such strike indicators function as a strike indicator, and also may, in particular instances, serve as a fishing depth positioning means.

To be operationally viewable, strike indicators are typically larger than the line 'guides' of a fishing rod (particularly the guides of fly rods, which are relatively small) and are typically attached at a fixed position along the fishing line. Therefore, without fisherperson intervention and removal of the attached indicator, the attached line is only retrievable through the guides of a fishing rod to the point of attachment of the strike indicator. For some fishing situations, this line retrieval limitation may not present a problem, because the length of line from the strike indicator attachment point to the hook(s) is less than or roughly equal to the rod length, enabling sufficient retrieval of line so that a hooked fish can be maneuvered to a position close enough for effective capture by the fisherperson. However, the line retrieval problem caused by prior art strike indicators is severe in many situations, and particularly in low-profile constrained contexts (e.g., boat or float-tube fishing), involving fishing with a hook suspended on a line from a strike indicator at depths that significantly exceed that of the rod length. Specifically, where the fishing depth exceeds the rod length, the line is not retrievable beyond the strike indicator attachment point (the strike indicator cannot pass through the line guides), and the distance from the rod tip to a hooked fish may be much greater than the rod length, making capture of the fish difficult if not impossible in low-profile and/or constrained fishing contexts. This substantial limitation not only reduces the number of fish catchable within a given time period because of loss of fish, but often results in harm to hooked fish because of the non-optimal capture conditions (hooked fish too far from the rod tip). While strike indicators that can be repositioned are known in the art, such repositioning is typically done by the fisherperson, and, practically speaking, cannot be effectively done once a fish has been hooked and the fisherperson and the fish are operationally engaged in an excited state.

One known approach to providing a strike indicator that is more easily slidable is the adjustable Frog Hair™ EZ-ON indicator (Gamma Technologies, Pittsburgh, Pa.), designed to be manually adjustable by sliding along a length of 'tippet' material. This approach is based on inserting line 'tippet' consecutively through two elastic positioning retainers that are retained at and within opposite ends of the axial bore of a buoyant indicator body (see FIG. 9). The elastic retainers enable the indicator to be forcibly repositioned along the leader, while providing sufficient gripping pressure against the leader to maintain its position. This system, however, has substantial drawbacks, because, due to the nature of the elastic positioning retainers, they become worn and cannot be reused, and the indicator cannot be reinstalled after removal from the leader (at least without obtaining new retainers and threading tippet therethrough using a special wire-loop threading tool). Additionally, while being slidably adjustable, these indicators are not quick release, and such adjustment is by means of significant force applied by the fisherperson, and does not enable, for example, practical repositioning of the indicator during a fish 'hook-up' when fish and fisherperson are actively engaged. Moreover, the elastic positioning retainers cannot pass over knots (e.g., 'blood' knots) that are typically found in most leaders being used, and even if they could their gripping character would be degraded, thereby rendering the indicator effectively useless in a short time.

A known approach to providing a releasable and slidable strike indicator is a quick release indicator (Waters West, Port Angeles, Wash.) designed to release in response to a fish 'hook-up.' This approach is based on inserting line 'tippet' consecutively through the axial bores of an foam-based (Styrofoam™-based) indicator and a black plastic stopper, forming a tippet loop in the tippet at a position between the indicator and the stopper, tucking a portion of the tippet loop into a stopper-receiving slot of the indicator, and inserting the stopper into the stopper receiving slot, thereby wedging, by pressure, the tucked tippet portion between the wall of the receiving slot and the stopper to reversibly attach the indicator stopper combination to the line tippet (see FIGS. 8A and 8B). With a fish 'hook-up,' the tension in the line increases and frees the tucked loop, thereafter allowing the indicator and stopper to freely slide along the fishing line. However, there are substantial drawbacks to this solution, including the fact that it is difficult, if not impossible, upon repeated use, to consistently wedge the tippet loop with a reproducible amount of force to provide the right amount of tension for triggering release on 'hook-up.' This is because, even if one were able to insert the stopper with consistent force into the receiving slot of the indicator, the amount of the tippet loop thereby wedge varies from event to event, and even more problematic, the amount of force required to effectively wedge the loop is enough to cause the loop material to deteriorate (e.g., deform, gouge, etc.) the wall of the receiving slot, giving rise to inconsistent and progressively deteriorating performance of the indicator system. Additionally, there is no provision for re-attaching the indicator at a set line position from one 'hook-up' to another to allow for reproducibly fishing at a set depth, and there is no provision (except the hook and the lines guides of the rod) to limit the slidable range. Moreover, because of the necessity to wedge enough stopper and tippet loop surface areas against the receiving slot wall to provide sufficient resistance to preclude inadvertent release events, the stopper and receiving slot must be of a sufficient size, thereby defining a minimum size (e.g., no such indicators are marketed that are smaller than about ½ inches to about ⅜ inches in diameter). Furthermore, the high profile of the stopper and the asymmetric design of the indicator/stopper combination are less than desirable in terms of line-fouling characteristics.

Therefore, there is a pronounced need in the art for strike indicators that are more easily and consistently disengagable from an attendant line or leader, and that are substantially more reusable. There is a pronounced need in the art for strike indicators that are disengagable by means other than direct contact or mediation by a fisherperson. There is a pronounced need in the art for strike indicators that are more easily and consistently disengagable, and thereafter readily slidable along a fishing line. There is a pronounced need in the art for a strike indicator system that is slidable along a fishing line within a user-settable defined range along a fishing line and/or leader. There is a pronounced need in the art for a strike indicator system that enables more effective and reproducible fishing with a strike indicator at depths significantly greater than the rod length.

There is a pronounced need in the art for novel devices and methods for adjustably and reversibly engaging a line (including, but not limited to fishing lines, ropes, string, cable, wire, cords, etc.) at an engagement position and/or for demarcating one or more positions and/or spans along a line.

SUMMARY OF THE INVENTION

Particular aspects of the present invention provide novel devices and methods for adjustably and reversibly engaging a line (including, but not limited to fishing lines, ropes, string, cable, wire, cords, etc.) at an engagement position and/or for demarcating one or more positions and/or spans along a line, for appending additional elements to the line and for joining another line to the line via attachment of sad additional element or line to the engaging (e.g. line clamping, pinching, attaching, etc.) members and devices. The inventive line-stop members are reversibly disengagable, and thereby slidably adjustable and positionable along a line, and two or more such line-stop members can be used to define user-selectable ranges or spans therebetween along a line, or can be used herein as modular means for joining two or more lines.

In preferred embodiments, the inventive line-stop members comprise: an elongated line clamping member having a line gripping member, or a plurality or at least one pair of line-gripping members (e.g., clamping arms or clamping surface or surfaces; e.g., one, two, three or more clamping arms or surfaces.) and having a longitudinal axial bore or channel suitable to allow slidable passage of a line through the line stop or clamping member; and an engagement collar (e.g., cylindrical or other shaped engagement collar) having a collar channel therethrough and slidably positionable along the line-clamping member, and suitable and positionable to reversibly hold the line-clamping member in a line-clamping position (e.g., a line-engagement position) to engage a line, and suitable and positionable (e.g., in a line-disengagement position) to reversibly disengage the line-clamping member from the line-clamping position to reversibly disengage a line.

In particular embodiments, as described in detail herein, the inventive line-stop members are insertable, attachable, engageable, etc., with and/or into a strike indicator or other buoyant flotation member to provide for a strike indicator system, and method of using same.

In additional embodiments, the inventive line-stop members are insertable, attachable, engageable, etc., with and/or into other objects or elements to be associated with the line via the line-stop member. For example, in certain embodiments, the surface of the engagement collar, or other accessible surface of the line-stop member, comprises at least one attachment means (e.g., at least one hook, loop, eye, snap, pin, clasp swivel, clevis clip, etc) to provide for attaching one or more additional objects (e.g., line, swivel member, blade member, propeller blade, weight or sinker, float member, etc.) to the line-stop member. In particular line-stop member embodiments, the attachment means comprises an accessory collar that attaches to the line stop member (e.g., to the 'collar mounting and retention portion,' as defined herein below, of the line-stop member). Preferably the accessory collar is rotatably attached to the line-stop member so that the collar (and anything attached to the attachment means of the collar) is free to rotate about the line-stop member (e.g., about the longitudinal axis thereof). In certain embodiments, the accessory collar comprises at least one attachment means on its surface (e.g., at least one hook, loop, eye, snap, pin, clasp swivel, clevis clip, etc) to provide for attaching one or more additional elements or objects (e.g., line, swivel member, blade member, weight or sinker, float member, etc.) to the line-stop member. In additional embodiments, the accessory collar comprises integral or attached blades or fins to modulate or direct movement of the collar in a fluid (e.g., air, water, etc.). For example the accessory collar may comprise integral propeller like blades or fins to impart rotation in a fluid environment. Preferably, the accessory collar is configured to rotate about the axis of the line stop member. The inventive line-stop members, therefore, not only have utility for engaging and/or demarcating one or more positions and/or spans along a line, rope, etc., and for attaching to strike indicators, but also have substantial utility for attaching to essentially anything that is desired to be brought in operable and/or spatial association with a line, rope, etc. In particular embodiments the line stop members are lures or attractors having blades or fins to impart movement or rotation when traveling through water. In particular lure or attractor embodiments, the engagement collar comprises such blades, fins or attachment means. In preferred, alternative embodiments, the accessory collar comprises such blades, fins or attachment means. Preferably, the accessory collar is configured to rotate about the axis of the line stop member.

In particular embodiments, the accessory collar is reversibly mountable upon the line stop member. In certain embodiments, the accessory collar is configured with a mounting slot such that the collar is mountable upon a line stop member already attached to a line. The collar is positioned around the line by lateral passage of the line through the slot, followed by subsequent mounting of the collar on the line stop member having, for example, compressible collar retaining means (e.g., the accessory collar, slotted or otherwise, can be snapped over the compressible collar retaining means as described herein).

Particular embodiments provide a novel strike indicator system for fishing lines (e.g., fly fishing lines and/or leaders), the system comprising: a disegagable fishing line strike indicator that is, in operation, disengagable from and thereafter slidable along a fishing line and/or leader; and at least one strike indicator line-stop member (as described herein) attachable to a fishing line or leader, and sufficient, in operation, to limit slidable travel of the disengaged strike indicator. In particular embodiments, the system comprises two attachable strike indicator line-stop members, suitable, in operation of the system, to delimit a slidable range of a disengaged slidable strike indicator along a fishing line and/or leader. In additional embodiments, the system further comprises a fishing line for attachment of the disengagable strike indicator and at least one strike indicator line-stop member. In particular aspects, the disengagable strike indicators comprise: a buoyant main body portion having an exterior surface, first and second main body ends, and an axial channel therebetween, with corresponding first and second main body end surface openings, wherein the channel is sufficient to accommodate slidable passage of a fishing line therethrough. There is an exterior line retaining member seat (e.g., a groove within the main body having sides and a bottom, or a ridge protruding from the main body surface having sides and a top), said retaining member seat running around the exterior surface of the main body. In preferred embodiments, the groove or ridge encompasses the channel axis such that the first and second end surface openings are disposed on opposite sides of the groove or ridge. In alternate embodiments, the retaining member seat (e.g., groove or ridge), while running around the exterior surface of the main body, does not thereby encompass the channel axis, such that the first and second end surface openings are disposed on the same side of the groove or ridge instead of on opposite sides as in preferred embodiments. A resilient annular line retention member having a suitable shape and size so as to be reversibly receivable and retainable by the retaining member seat (e.g., receivable within the groove, or upon the ridge), is operative with the seat to retain a fishing line passing therebetween at two points. Upon application of sufficient line tension, the resilient member is displaced from the groove or ridge, thereby disengaging the strike indicator and thereafter allowing sliding of the strike indicator main body axial channel along the fishing line.

Further aspects provide a method of fishing (for any type of water and fishing; e.g., salt water, fresh water, rivers, lakes, trout, salmon, bass, bluefish, etc.) with the inventive strike indicator system, comprising: a fishing line and/or leader; a buoyant disengagable fishing line strike indicator that is reversibly attachable to, disengagable from and thereafter slidable along a fishing line and/or leader; and at least one strike indicator line-stop member, as described and disclosed herein, that is attachable to a user-selectable position along the fishing line, and sufficient, in operation, to limit slidable travel of the disengaged strike indicator along the fishing line. In particular embodiments, the method is practiced with a system that comprises first and second attachable strike indicator stop members attached at different user-selected positions along the fishing line and/or leader, and suitable, in operation of the system, to delimit a slidable range of the disengaged slidable strike indicator along the fishing line. In particular aspects, the inventive disengagable strike indicator is attached to the line in engagement with the first line stop member attached at a first fixed line position, and upon disengagement, the disengaged strike indicator is thereafter slidable along the fishing line between the first and second line stop members, enabling, for example, practical and effective fishing with a strike indicator at depths greater than the rod length.

BRIEF DESCRIPTION OF THE DRAWINGS

FIGS. 10A and 10B show, according to particular aspects, another exemplary embodiment similar to that of FIGS. 1 and 2, but having a line retaining member seat that is in the form of a rounded ridge protruding from the main body surface (FIG. 10A), instead of a groove within the main body. The line retaining member (FIG. 10B) has a groove on its inner surface that cooperatively conforms to the rounded ridge retaining member seat, and is operative with the ridge seat to retain a fishing line passing therebetween at two points.

FIGS. 11A and 11B show, according to particular aspects, another exemplary embodiment similar to that of FIGS. 1 and 2, but having a line retaining member seat that is in the form of an inverted "V"-shaped ridge protruding from the main body surface (FIG. 11A), instead of a groove within the main body. The line retaining member (FIG. 11B) has a groove on its inner surface that cooperatively conforms to the "V"-shaped ridge retaining member seat, and is operative with the ridge seat to retain a fishing line passing therebetween at two points.

FIGS. 18A and 18B show the combination before and after, respectively, engagement of the screw-collar clamping line-stop member with the internal engagement collar 24. FIG. 18C shows, according to further aspects, an exemplary tool for disengaging the screw-collar clamping line-stop member from the internal engagement collar 24. In this exemplary embodiment, the internal engagement collar 24 and the counterbores 22 are asymmetrically configured within the strike indicator main body.

FIGS. 19A and 19B show the combination before and after, respectively, engagement of the screw-collar clamping line-stop member with the internal engagement collar 24. FIG. 19C shows, according to further aspects, an exemplary tool for disengaging the screw-collar clamping line-stop member from the internal engagement collar 24. In this exemplary embodiment, the internal engagement collar 24 and the counterbores 22 are asymmetrically configured within the strike indicator main body.

DETAILED DESCRIPTION OF THE INVENTION

Particular aspects of the present invention provide novel devices and methods for adjustably and reversibly engaging a line (including, but not limited to fishing lines, ropes, string, cable, wire, cords, etc.) at an engagement position and/or for demarcating one or more positions and/or spans along a line, for appending additional elements to the line and for joining another line to the line via attachment of sad additional element or line to the engaging (e.g. line clamping, pinching, attaching, etc.) members and devices. The inventive line-stop members are reversibly disengagable, and thereby slidably adjustable and positionable along a line, and two or more such line-stop members can be used to define one or more user-selectable ranges or spans therebetween along the line, or can be used herein as modular means for joining two or more lines by means of a line or connected therebetween.

The term "lines" as used herein refers to linear material that can be demarcated and includes but is not limited to fishing lines, ropes, string, cable, wire, cords, ribbons, or any material that can be formed into a line-like structure and to which the present inventive line stop members can be attached.

Additional aspects provide novel disengagable strike indicator systems that comprise, in addition to a disengagable strike indicator, at least one strike indicator line-stop member (as described herein) that is attachable at a user-selected fixed position along a fishing line, and is also engagable with the inventive strike indicator main bodies to limit slidable travel of a disengaged strike indicator along the fishing line.

Further aspects provide novel methods for fishing, comprising fishing with an inventive disengagable strike indicator, or the inventive strike indicator system.

Yet further aspects provide novel methods for effective and efficient fishing with a strike indicator at a depth greater than the length of a fishing rod, comprising fishing with an inventive disengagable strike indicator, or strike indicator system. The methods facilitate efficient capture of a hooked fish, increase fishing efficiency and the overall fishing experience, and decrease attendant injury to captured fish.

The following discussion describes in detail particular aspects and embodiments of the invention and several variations thereof. This discussion should not be construed as limiting the invention to the particular embodiments or to those particular variations. Practitioners skilled in the art will recognize numerous other embodiments and variations, as well, that are encompassed within the scope of the claim subject matter.

Figure 16A:
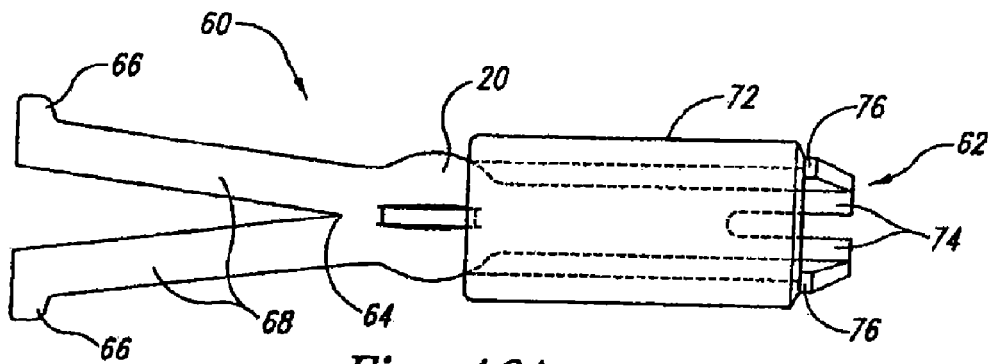
FIGS. 16A-G, show, according to one exemplary embodiment of the present invention, a snap-collar clamping line-stop member.
Figure 16B:
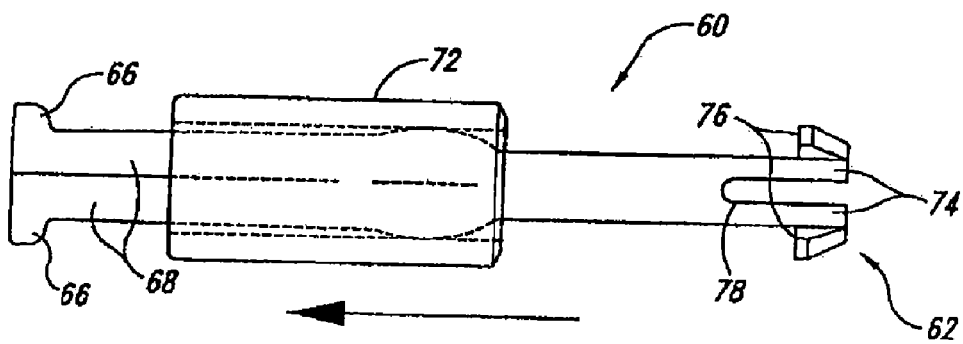
Figure 16C:
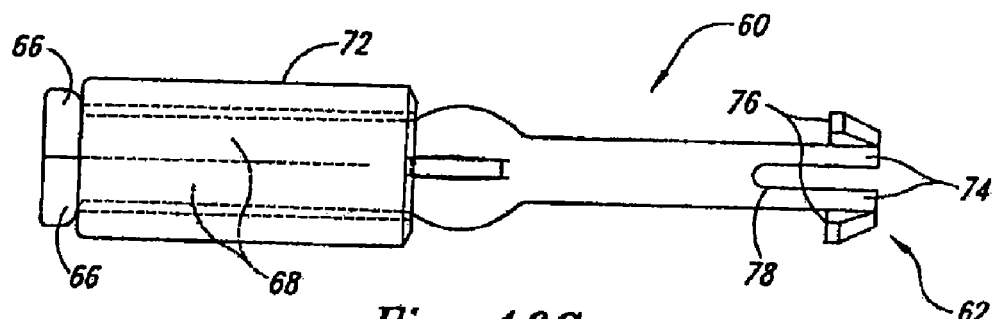
Figure 16D:
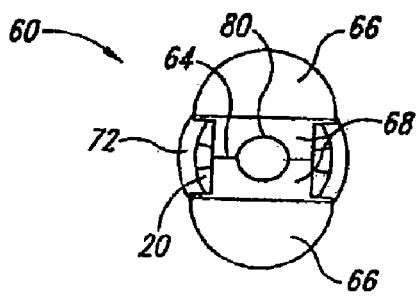
Figure 16E:
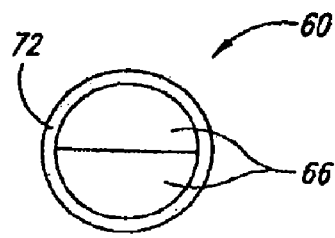
Figure 16:
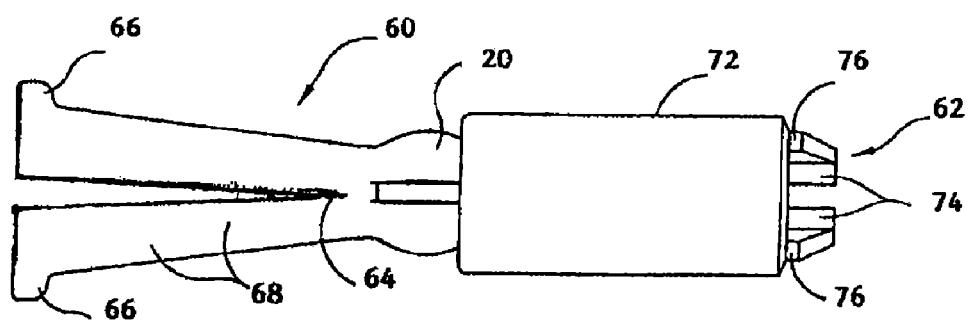
Figure 16:
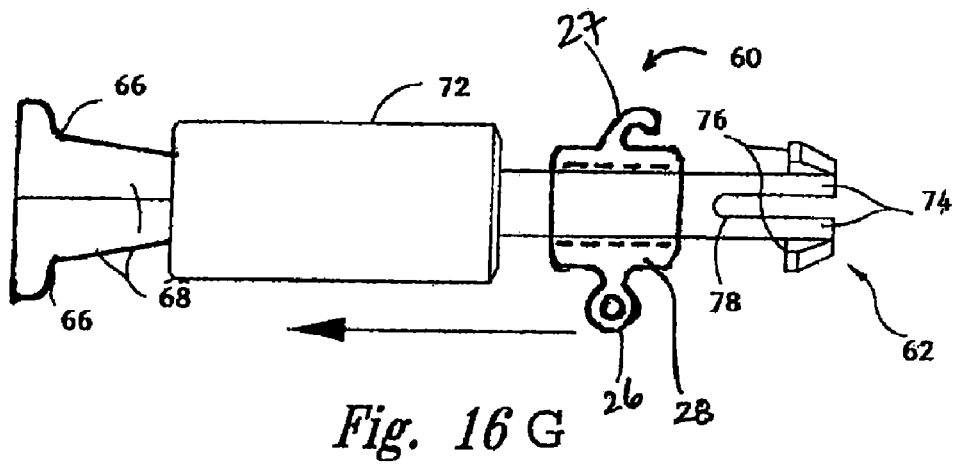

Disengagable Line-Stop Member:

FIGS. 16 A-G, show, according to one exemplary embodiment of the present invention, a slide-collar clamping line-stop member. The line-stop member 10 comprises a generally elongated line-clamping member 60 having a length and outer surface and having a longitudinal or axial bore suitable for operative passage of a line, and an engagement collar 72

Figure 17A:
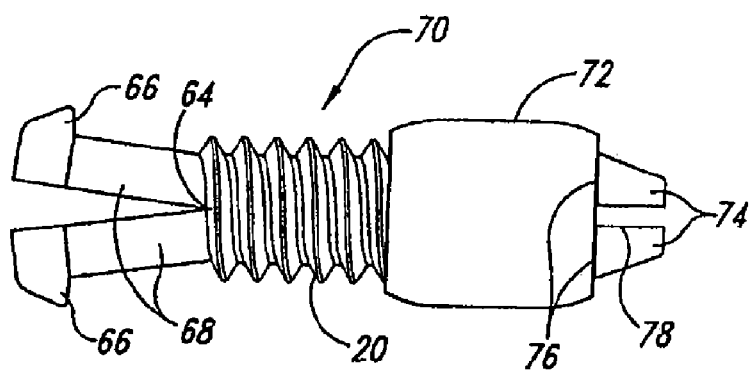
FIGS. 17A-M show, according to another exemplary embodiment of the present invention, a screw-collar clamping line-stop member.
Figure 17B:
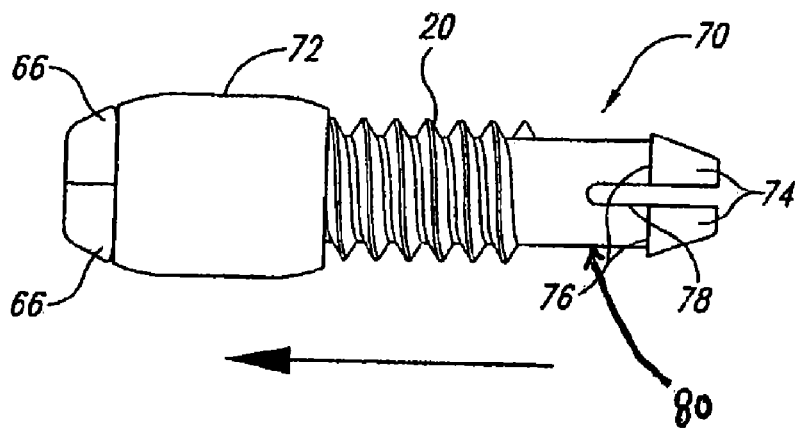
Figure 17C:
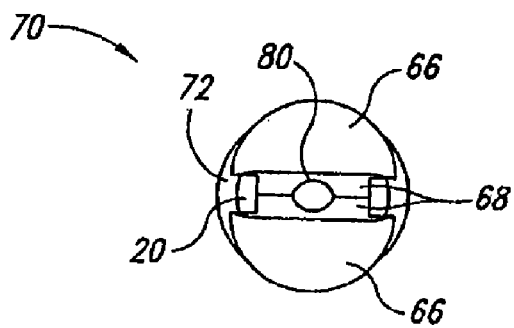
Figure 17D:
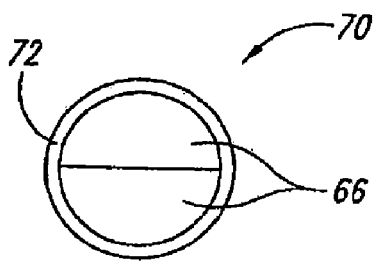
Figure 17:
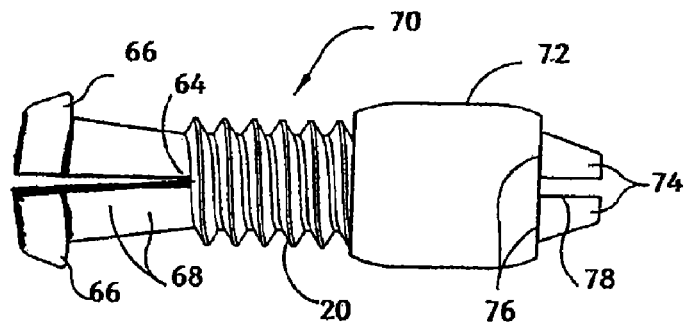
Figure 17:
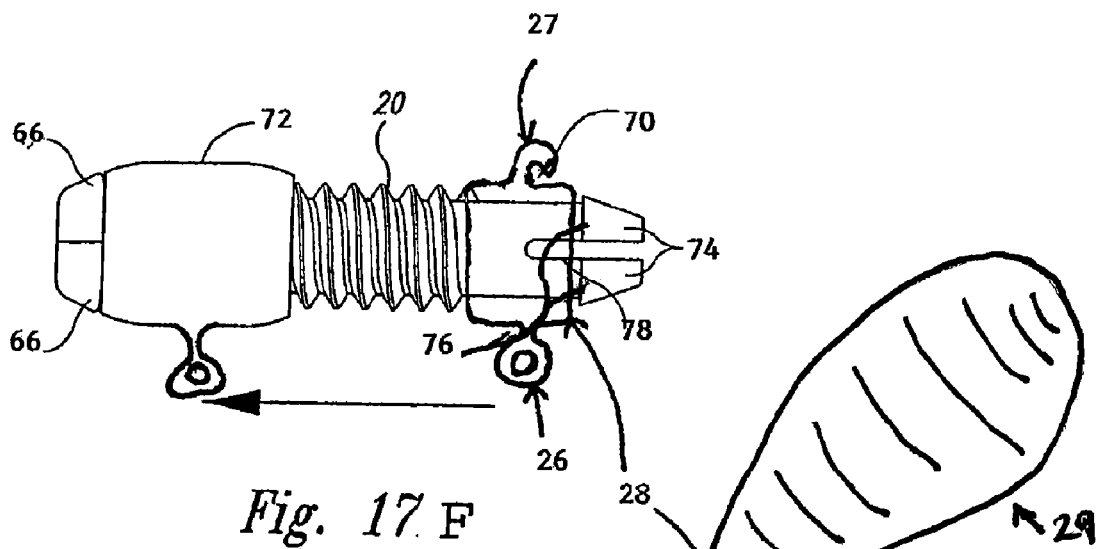

(e.g., cylindrical collar) having a collar channel therethrough for receiving (e.g., reversibly receiving) the line-clamping member, and slidably positionable along the line-clamping member 60, and suitable and positionable to reversibly hold the line-clamping means 68 (e.g., line-clamping arms 68) of the line-clamping member 60 in a line-clamping position to engage, during operation of the line stop member, a line p, and suitable and positionable to reversibly disengage the line-clamping means 68 of the line-clamping member 60 from the line-clamping position to reversibly disengage a line. The line-clamping member 60 comprises a longitudinal axial bore or channel suitable to allow slidable passage of a line therethrough (see, e.g., FIG. 17H). The line-clamping member 60 additionally comprises, at one end, a line-clamping or line retaining portion, e.g., one or a plurality of line-clamping members or line-clamping arms 68 (e.g., two or three such arms) or members, and at least one of the arms or members, or each arm or member having a collar-stop member (e.g., flange) 66 at one end thereof, the line-clamping arms 68 or members operative with the engagement collar 72, and operatively associated and positionable with respect to each other (e.g., by means of at least one hinge or pivot element 64, etc) to allow for clamping a line therebetween to engage a line. Preferably, the axial bore passes through at least through the collar-mounting and retention portion 62 (see FIG. 16G) of the line clamping member 60, and may extend somewhat into but not necessarily through the lengths of the line-clamping arms. The line clamping arms are preferably flat on their surface or at least a majority of their surface, or substantially flat on their surface or on a majority thereof. In particular embodiments, the portions of the retention arms adjacent to the hinge position(s)/axial bore comprise tapered (e.g., half-funnel or half-conical) grooves 82 extending, at a base diameter of the taper, from approximately the arm pivot position of line gripping surface of the arms and tapering to an apex at the line-gripping surface (see, e.g., the threaded collar embodiment of FIG. 17H). Such line access tapers 82 in the clamping arms, extend only partially (e.g., from about 1% to about 50%, from about 5% to about 45%, about 20%, about 30%, about 40%, etc.) along the length of the line-gripping surface of the arms, and facilitate unobstructed introduction of a line through the line-clamping member 60 and arm base (pivot position) even when the arms, in the non-line retention position, are disposed at an acute angle with respect to each other (e.g., 15-30 degrees). In other embodiments for retaining larger diameter lines, ropes, wires, etc., the line clamping arms may comprise axial line grooves (e.g., half-circular grooves) on the entire length of their opposing gripping surfaces to accommodate better retention of larger lines, wherein the radius or dimension of the grooves are proportioned to be correspondingly smaller than the radius or proportion of the lines to be retained therein, so as to yet allow for line retention when the arms are clamped in the line-retention position (and the surrounding non-grooved clamping surfaces of the clamping arms are yet engageable and clamped together). In particular embodiments, the line stop members are, for example, about 0.5 inches in length, and the line-clamping arms 68 are about 0.15 inches in length.

FIGS. 16F, 16G, 17E and 17F show preferred embodiments comprising line-clamping arms that are tapered or beveled or ramped to be thicker at their collar stop member (e.g., flange) ends. Preferably, although the engagement collar of FIG. 16G is shown in an intermediate position, for both tapered and untapered arm embodiments the engagement collar is positioned near or against the collar stop member 66 when positioned to hold the line-clamping means 68 (e.g., line-clamping arms 68) of the line-clamping member 60 in a line-clamping position. According to preferred embodiments, such tapering (e.g., ramping, beveling, thickening, etc.) allows for application of more line pressure when the engagement collar is positioned in the engagement position. As will be appreciated by one of ordinary skill in the art, a variety of collar and tapered member configurations can be used to customize and provide for the desired amount of line pressure, and to accommodate different line diameters. The line clamping members may comprise or be of essentially any material (e.g., nylon, plastic, polypropylene, metal, rubber, etc), but preferably comprise or are of a material that affords adequate frictional gripping and resilience without damaging the line, and many configurations and materials are encompassed within the scope of the present invention and will be appreciated by those of skill in the art. In particular embodiments, the line-clamping surfaces of the line-clamping member, members or arms comprise texturing or other gripping means to enhance line retention therein or therebetween. In particular embodiments, such gripping means comprise textured surfaces, grooves, ridges, and/or surface protrusions or extensions that conform and are receivable into complementary receiving surfaces on the opposing gripping surface or opposing clamping arm surface, etc. Additionally gripping materials may also be incorporated into or onto, or integrated within, the gripping surfaces or the clamping member, members or arms, etc.

The line-clamping member 60 additionally comprises, at the other end, a collar-mounting and retention portion 62, comprising a collar mounting and retention member, or comprising a plurality of spaced, resilient collar-mounting and retention arms 74 having a retention arm collar-stop flange 76. In particular embodiments, a plurality of resilient collar-mounting and retention arms 74 are spaced or separated by at least one slot 78, the slot suitable to allow for reversibly decreasing (e.g., by compressing the arms toward each other) the distance between the collar-mounting and retention arms, or between a portion thereof, to allow for initial mounting and retention (by virtue of the retention arm collar-stop flanges) of the engagement collar 72 on the line-clamping member 60. In certain embodiments, and situated approximately between the pair of line-clamping arms 68 and the collar-mounting and retention portion 62 is an engagement collar positioning portion 20 or member. The engagement collar positioning portion 20 comprises means to position the engagement collar 72 at a particular position or end the line-clamping member 60. In one aspect, the engagement collar positioning portion 20 allows for engaging a line by positioning or retaining the engagement collar 72 on the line-clamping member 60 in a position (e.g., a line-engagement position) that affords operative association with the line-clamping arms 68 or member(s) to allow for clamping a line therebetween. In another aspect, the engagement collar positioning portion 20 allows for disengaging a line by positioning or retaining the engagement collar 72 on the line-clamping member 60 in a position (e.g., a line-disengagement position) that precludes operative association of the engagement collar 72 with the line-clamping arms 8, or clamping member(s). In the exemplary embodiment shown, the engagement collar positioning portion 20 comprises a resilient compressible bulge having, in the uncompressed state, an outside diameter larger than the engagement collar channel diameter such that the engagement collar positioning portion 20 must be compressed (e.g., by applying sufficient force with the engagement collar) to reposition the collar between the line-engagement position and the line disengagement position. It will be obvious to those of ordinary skill in the art that the engagement collar positioning portion 20 could alternatively be engageable into a complementary receiving means within the engagement collar, and that such complimentary engagement could position or retain the engagement collar 72 on the line-clamping member 60 in a position (e.g., in a line-engagement, or a line-disengagement position) that provides for, or precludes operative association of the engagement collar 72 with the line-clamping arms 68, or clamping member(s).

FIGS. 17A-J, show, according to another exemplary embodiment of the present invention, a screw-collar clamping line-stop member. The line-stop member comprises an elongated line-clamping member 70, and an cylindrical engagement collar 72 having a collar channel therethrough and positionable along the line-clamping member 70, and suitable and positionable to reversibly hold the line-clamping member 70 in a line-clamping position to engage a line, and suitable and positionable to reversibly disengage the line-clamping member 70 from the line-clamping position to reversibly disengage a line. The line-clamping member 70 comprises a longitudinal axial bore or channel suitable to allow slidable passage of a line therethrough. The line-clamping member 70 additionally comprises, at one end, a line clamping means, for example, one or a plurality of line-clamping arms 68 or members, at least one arm or member having a collar-stop flange 66 at one end thereof, the line-clamping arms or members operative with the engagement collar 72, and operatively associated and positionable with respect to each other (e.g., by means of at least one hinge or pivot element 64, etc) to allow for clamping a line, wire, rope, etc., therebetween to engage the line, wire, rope, etc. Preferably, the axial bore passes through at least through the collar-mounting and retention portion 80 (see FIG. 17H) of the line clamping member 70, and may extend somewhat into but not necessary through the lengths of the line-clamping arms 68. The line clamping arms are preferably flat on their surface or at least a majority of their surface, or substantially flat on their surface or on a majority thereof. In particular embodiments, the portions of the retention arms adjacent to the hinge position(s)/axial bore comprise tapered (e.g., half-funnel or half-conical) grooves 82 extending, at a base diameter of the taper, from approximately the arm pivot position of line gripping surface of the arms and tapering to an apex at the line-gripping surface (see, e.g., the threaded collar embodiment of FIG. 17H, Detail B). Such line access tapers 82 in the clamping arms, preferably extend only partially (e.g., from about 1% to about 50%, from about 5% to about 45%, about 20%, about 30%, about 40%, etc.) along the length of the line-gripping surface of the arms, and facilitate unobstructed introduction of a line through the line-claming member 70 and arm base (pivot positioned) even when the arms, in the non-line retention position, are disposed at an acute angle with respect to each other (e.g., 15-30 degrees). In other embodiments for retaining larger diameter lines, ropes, wires, etc., the line clamping arms may comprise axial line grooves (e.g., half-circular grooves) on the entire length of their opposing gripping surfaces to accommodate better retention of larger lines, wherein the radius or dimension of the grooves are proportioned to be correspondingly smaller than the radius or proportion of the lines to be retained therein, so as to yet allow for line retention when the arms are clamped in the line-retention position (and the surrounding non-grooved clamping surfaces of the clamping arms are yet engageable and clamped together). In particular embodiments, the line stop members are, for example, about 0.5 inches in length, and the line-clamping arms 68 are about 0.15 inches in length.

The line-clamping member 70 additionally comprises, at the other end, a collar-mounting and retention portion 80, comprising a collar-mounting and retention member, or a plurality of spaced, resilient collar-mounting and retention arms 74, at least one such member or arm having a retention arm collar-stop flange 76. In particular embodiments, the plurality of resilient collar-mounting and retention arms are spaced or separated by at least one slot 78, the slot suitable to allow for reversibly decreasing (e.g., by compressing the arms toward each other) the distance between the collar-mounting and retention arms to allow for initial mounting and retention (by virtue of the retention arm collar-stop flanges) of the engagement collar 72 on the line-clamping member 70. Situated between the pair of line-clamping arms 68 and the collar-mounting and retention portion 80 is an engagement collar positioning portion 20. The engagement collar positioning portion 20 comprises means to position the engagement collar 72 on the line-clamping member 70. In one aspect, the engagement collar positioning portion 20 allows for engaging a line by positioning or retaining the engagement collar 72 on the line-clamping member 70 in a position (e.g., a line-engagement position) that affords operative association with the line-clamping arms 68 or members to allow for clamping a line therebetween. In another aspect, the engagement collar positioning portion 20 allows for disengaging a line by positioning the engagement collar 72 on the line-clamping member 70 in a position (e.g., a line-disengagement position) that precludes operative association with the line-clamping arms 68. In the exemplary embodiment shown, the engagement collar positioning portion 20 comprises thread means complementary to thread receiving means located within the engagement collar channel such that the engagement collar positioning portion 20 can be engaged by threading or screwing the engagement collar thereon between the line-engagement position and the line disengagement position.

In particular embodiments, the engagement collar comprises a texture or surface pattern to facilitate gripping and/or turning, positioning or threading the engagement collar on the line-clamping member. FIG. 17K shows an engagement collar having longitudinal ridges and/or grooves on the exterior surface to facilitate gripping and/or turning, positioning or threading thereof. The ends of the engagement collar are preferentially beveled or angled. In particular embodiments, the engagement collar comprises or consists of a material that is different than the material of the line-clamping member with which it interacts or engages. For example, the line-clamping member 60 or 70, may comprise or consist of polypropylene, where the engagement collar may comprise or consist of metal, polycarbonate, DELRIN® (e.g., DuPont™ Delrin® acetal polyoxymethylene (POM) resin). In particular embodiments, the collar comprises or consists of metal (e.g., lead, steel, iron, etc.) and provides a weight to the line stop member, and such weighted embodiments can be used as adjustable line weights for fishing and other applications where it is desirable to reversibly and/or adjustably impart a weight to a line. The weight of such weights can be varied by varying the length, thickness and/or material of the engagement collar.

In particular embodiments, the engagement collar comprises one or more attachment members suitable for attaching one or more elements (e.g., lines, spoons 29, blades, hooks 31, swivels 33, streamers, etc.) thereto (see, e.g., the engagement collar 72 of FIG. 17F). In certain embodiments, the engagement collar comprises one or more full loop or 'eye' members, and/or comprises one or more clip (e.g., clevis clip) members, for attachment of or more elements (e.g., lines, spoons 29, blades, hooks 31, swivels 33, and other elements used in the fishing or other arts for example) thereto. In this way, the line stop member can further provide an attachment means, and can be converted into a lure, attractor member, or some other function member via attachment of additional elements to the engagement collar. In particular embodiments the engagement collar comprises one or more attached or integral fins, blades or propeller surfaces for imparting motion to the line stop member as it travels through, for example, water while attached to a fishing line. The engagement collar may be of a different color than the line-clamping member to which it is associated. In particular embodiments, the line-clamping member is clear and/or translucent, while the engagement collar is colored and/or opaque. The engagement collar and/or line-clamping member may be fluorescent, phosphorescent, or luminescent.

Figure 17G:
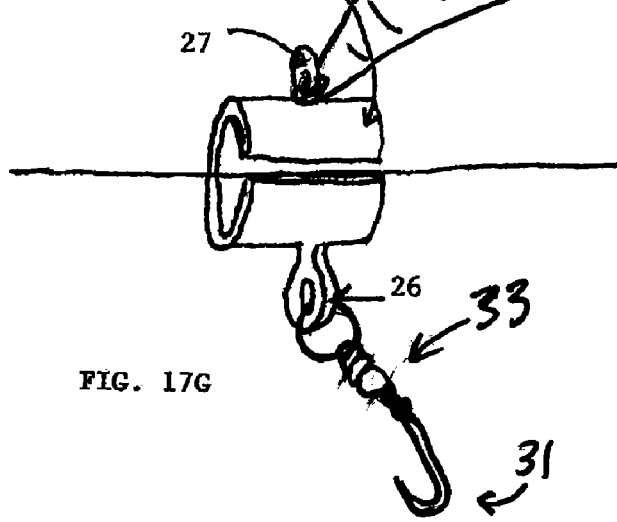
Figure 17:
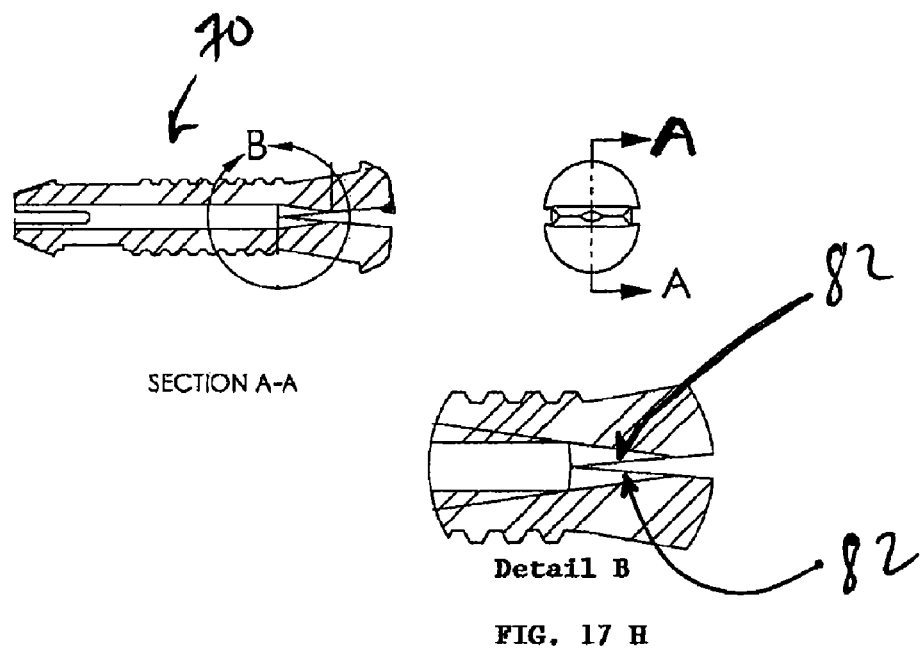
Figure 17I:
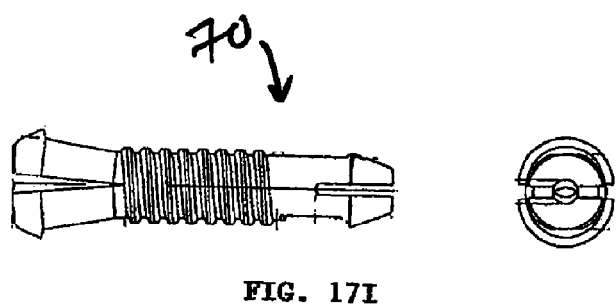
Figure 17J:
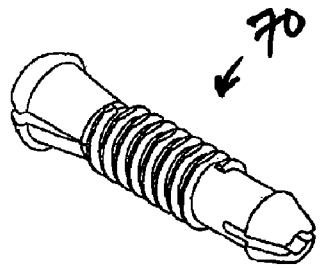

In particular embodiments, the line stop members comprise, in addition to the engagement collar, an accessory collar 28 that comprises one or more attachment members suitable for attaching one or more elements (e.g., lines, spoons 29, blades, hooks 31, swivels 33, streamers, etc.) thereto (see, e.g., the accessory collar 28 of FIGS. 16G, 17F, 17G). In certain embodiments, the accessory collar 28 comprises one or more full loop or 'eye' members, and/or comprises one or more clip (e.g., clevis clip) members, for attachment of or more elements (e.g., lines, spoons, blades, hooks, swivels, and other elements used in the fishing or other arts for example) thereto. Therefore, either the engagement collar, the accessory collar, or both may comprise one or more attachment members suitable for attaching one or more elements (e.g., lines, spoons 29, blades, hooks 31, swivels 33, streamers, etc.) thereto. In this way, the line stop member can further provide an attachment means, and can be converted into a lure, attractor member, weight element, or some other functional member via attachment of additional elements to the accessory collar. In particular embodiments, the accessory collar comprises one or more attached or integral fins, blades or propeller surfaces for imparting motion to the line stop member as it travels through, for example, water while attached to a fishing line. The accessory collar, like the engagement collar, may be of a different color than the line-clamping member to which it is associated. In particular embodiments, the line-clamping member is clear and/or translucent, while the accessory collar is colored and/or opaque. The accessory collar, and/or the engagement collar, and/or the line-clamping member may be colored, clear, fluorescent, phosphorescent, or luminescent. In particular embodiments, the accessory collar comprises or consists of metal (e.g., lead, steel, iron, etc.) and provides a weight to the line stop member, and such weighted embodiments can be used as adjustable line weights for fishing and other applications where it is desirable to reversibly and/or adjustably impart a weight to a line. The weight of such weights can be varied by varying the length, thickness and/or material of the engagement collar.

In particular embodiments (FIG. 17G), the accessory collar is slotted (e.g., comprises a 'slotted' cylinder) otherwise equipped with line access means (e.g., carbiner type, or closeable "C" type means) to provide line access for mounting onto a line for subsequent engagement of the accessory collar with a line-stop member that is already mounted on the line. In this way, accessory collars comprising various accessories can be interchangeably, removeably attached to and detached from a line-mounted line-stop member so as to provide for unprecedented flexibility and adaptability for a variety of needs (e.g., different fishing accessories) under a variety of conditions and environments.

In certain embodiments (e.g., fishing embodiments), the accessory collar is configured so that it is free to rotate about the longitudinal axis of the line-clamping member. In other embodiments, the accessory collar and/or the line-clamping member is configured with stop members to partially limit, demarcate or preclude rotation about the axis of the line-clamping member. The accessory collars may, for example, be freely rotatable, or may rotate 45 degrees, 90 degrees, 180 degrees, etc., about the longitudinal axis of the line-clamping member.

In particular embodiments, lights and or other sensory emitting elements can be mounted to the line-stop members and/or to the engagement and/or accessory collars thereof. In particular embodiments, the line stop members and/or collars comprise or are made of electrically conductive materials. In alternative embodiments, the line stop members and/or collars comprise or are made of electrically non-conductive materials. Particular embodiments can be used in decorative and/or functional lighting, where flexibility in color, and/or in another sensory aspect, and/or position is desired (home lighting, Christmas tree lighting, holiday lighting, safety lighting, indoor and outdoor lighting, etc.).

The inventive line stop members are useful for a broad array of applications in the fishing and non-fishing arts. The line stop members can be used essentially anywhere lines, ropes, wires, ribbons, and the like are used, and where line-related information, decoration, functions, attachments, etc., are needed and/or desired, including but not limited to line markings, line attachments, and/or decorations in: fencing; construction sites, framing, surveying, building, mock-ups, indoor and outdoor lighting, clothes lines, camping (e.g., tent lines, pack lines, tether lines, animal tether and/or handing lines and leashes, etc), fresh water marine lines, salt water marine lines (preferably using non-corrosive materials), games, apparel, belts, packs, straps, connecting lines, etc.

In particular embodiments the line stop member comprises a leveling means (e.g., bubble level, electronic level, laser levels, sonic levels, or the like).

In particular embodiments, the line stop members comprise a target (e.g., shooting or archery target, etc.) attached, for example, to the attachment members of the engagement and/or accessory collar.

In particular embodiments, the line stop members comprise a signage (e.g., notices, advertisements, warnings, designations, labels, directional indicators, etc) attached, for example, to the attachment members of the engagement and/or accessory collar.

According to preferred aspects of the present invention, the inventive line-stop members can be used as part of a system, in combination with disengagable strike indicators as described herein in detail. Moreover, while the above-described inventive line-stop members can be designed in essentially any size to accommodate a variety of line types and diameters, in preferred aspects, the inventive line-stop members are designed to be dimensionally compatible for engagement within the axial bores (axial channels) of the disengagable strike indicators described in detail herein.

Figure 12A:
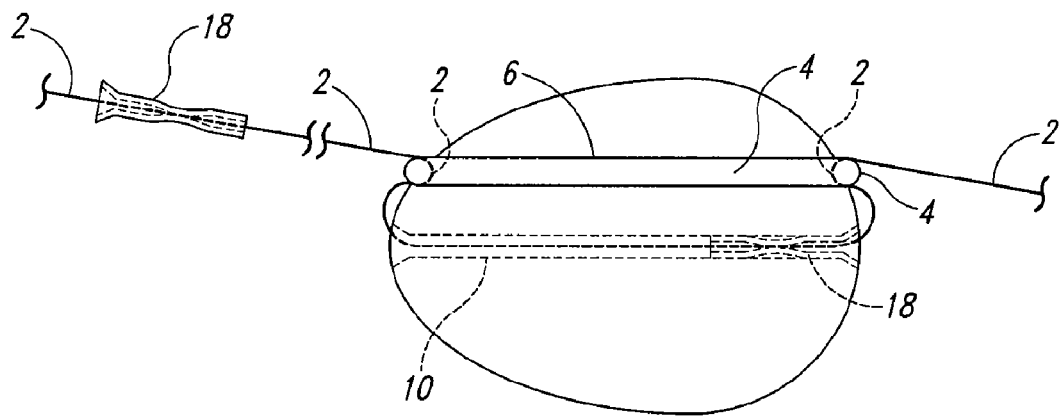
FIGS. 12A and 12B show, according to additional aspects, two alternate exemplary embodiments, which are similar to those shown in FIGS. 2 and 4, except the retaining member seat (e.g., groove or ridge), while running around the exterior surface of the main body, does not thereby encompass the channel axis, such that the first and second end surface openings are disposed on the same side of the retaining member seat (e.g., groove or ridge) instead of on opposite sides.
Figure 12B:
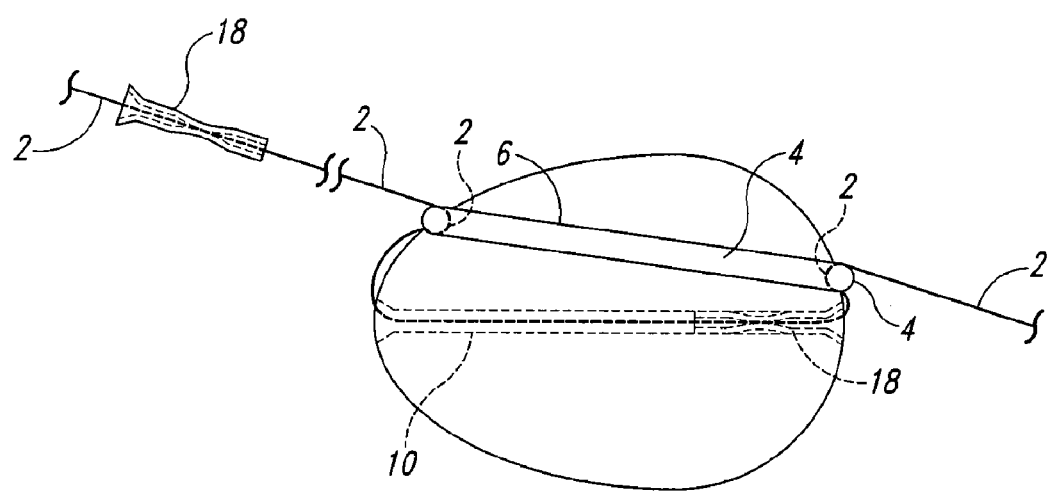

Disengagable Strike Indicator:

With reference to FIGS. 1, 2, 5A, 5B, 6A-6G, 10A, 10B, 11A, 11B, 12A and 12B, 13A-E, 14 and 15A and B, particular embodiments of the present invention are directed to a disengagable strike indicator 28 for a fishing line, comprising a buoyant main body portion 16 having an exterior surface 14, first and second main body ends, and an axial channel 10 therebetween, with corresponding first and second main body end surface openings 8, the channel 10 sufficient to accommodate slidable passage of a fishing line 2 therethrough. The main body 16 additionally comprises an exterior line retaining member seat (e.g., groove, channel, raised ridge, etc.), which in this embodiment is a groove 6, having sides and a bottom, within and around the exterior surface 14, wherein, in this embodiment, the groove 6 encompasses the channel 10 axis such that the first and second end surface openings 8 are disposed on opposite sides of the groove 6. In alternate exemplary embodiments (see FIGS. 10A and 11A), the line retaining member seat comprises an elevation or ridge 7 (e.g., rounded or inverted "V"-shaped) protruding, at least to some extent, from the main body surface 14. In particular less preferred alternate embodiments (see FIGS. 12A and 12B), the line retaining member seat (e.g., groove, channel, raised ridge, etc.) is disposed around the exterior surface 14, but does not encompass the channel 10 axis, such that the first and second end surface openings 8 are disposed on the same side of the retaining member seat (e.g., groove 6). Embodiments as shown in FIGS. 12A and 12B are less preferred, because, inter alia (and absent additional retentions means), the retaining member 4 is not retained on the line after disengagement (see below). The exemplary disengagable strike indicator 28 of FIGS. 1 and 2 further comprises a resilient (e.g.: elastic; pliant; supple; flexible, etc.) line retention member 4 having a suitable shape (e.g., annular) and size so as to be reversibly receivable and retainable by the line retaining member seat (e.g., within the groove 6, or upon the ridge 7 (see FIGS. 10A, 10B, 11A and 11B), and operative with the seat to sufficiently retain a fishing line 2 passing therebetween at two points. In particular embodiments of the exemplary strike indicator 28 (see FIGS. 1 and 2), the main body channel 10 axis intersects a plane defined by the retention member seat (e.g., the exterior groove 6) at a right angle. In preferred embodiments, however, the main body channel 10 axis intersects a plane defined by the annular retention member seat (e.g., the exterior groove 6) at an acute angle (i.e., less than ninety degrees). Preferably, the angle between the main body channel 10 axis at one or the other main body end 8, and a plane defined by the retention member seat (e.g., the exterior groove 6) is selected from the range group consisting of: 180 degrees to 0 degrees, 90 degrees to 0 degrees, 45 degrees to 0 degrees less than about 90 degrees and greater than about 1 degree, less than about 90 degrees and greater than about 2 degrees, less than about 45 degrees and greater than about 1 degrees, less than about 30 degrees and greater than about 2 degrees; less than about 20 degrees and greater than about 5 degrees; less than about 15 degrees and greater than about 7 degrees, less than about 29 degrees and greater than about 25 degrees, about 28 degrees, and 28 degrees. Preferably, the angle between the main body channel 10 axis at one or the other main body end 8, and a plane defined by the retention member seat (e.g., groove 6) is less than about 15 degrees and greater than about 7 degrees. Preferably, the angle between the main body channel 10 axis at one or the other main body end 8, and a plane defined by the retention member seat (e.g., groove 6) is less than about 29 degrees and greater than about 27 degrees. In particular embodiments, the angles, in opposite directions, between the main body channel 10 axis at the respective opposite main body ends 8, and a plane defined by the retention member seat (e.g., groove 6) are the same or substantially the same. In alternate embodiments, the angles, in opposite directions, between the main body channel 10 axis at the respective opposite main body ends 8, and a plane defined by the retention member seat (e.g., groove 6) are different. In particular embodiments, the distance, in opposite directions, from the first and second main body end surface openings 8 to the retention member seat (e.g., groove 6) is the same or substantially the same. In alternate embodiments, the distances, in opposite directions, from the first and second main body end surface openings 8 to the retention member seat (e.g., groove 6) are different. Preferably, intersection of plane defined by the retention member seat (e.g., groove 6c channel, raised ridge, etc.) by the main body channel 10 axis is at a position corresponding to the center of the main body channel.

In alternate less preferred embodiments (see FIGS. 12A and 12B), the main body channel 10 axis does not intersect a plane defined by the retention member seat (e.g., the exterior groove 6 or ridge 7, etc.). In particular embodiments, the resilient annular line retention member 4 protrudes, at least to some extent, beyond exterior surface 14.

In embodiments where the resilient line retention member 4 is receivable into a groove 6 or channel, the retention member 4 is preferably receivable into the groove 6 to a distance not greater than about one-half the radial width of the resilient member 4, so that at least about half of the member 4 protrudes above the surface 14. However, according to aspects of the present invention, the extent of receipt of the retention member 4 into the groove 6 may vary, so long as the retention member 4 is sufficiently and reversibly retainable. In preferred embodiments, the depth of the retention member seat is in the range of about 0.025 cm to about 0.127 cm (e.g., 0.01 to about 0.05 inches), about 0.038 cm to about 0.10 cm (e.g., 0.015 to about 0.04 inches), about 0.05 cm to about 0.076 cm (e.g., 0.02 to about 0.03 inches). Preferably, the depth of the retention member seat is in the range of about 0.043 cm to about 0.086 cm (e.g., 0.017 to about 0.034 inches).

In particularly preferred embodiments (see FIGS. 13A-E and 14), the depth of the retention member seat (e.g., groove, channel, raised ridge, etc.) is greater at or near the main body ends than at or near the main body sides (central side areas). Preferably, in such embodiments, the depth of the retention member seat is greater at or near the main body ends and tapers to a lesser depth at or near the main body sides (i.e., central side areas; corresponding to a position at or near the center of the main body channel). In particularly preferred embodiments, the depth of the retention member seat at or near the main body ends tapers to a lesser depth at or near the main body sides (central side areas), with the depth at or near the main body ends being twice, or about twice, the seat depth at or near the main body sides (central side areas). For example, in particular embodiments, the seat depth at or near the main body ends is about 0.086 cm (e.g., about 0.034 inches), and tapers to a depth at or near the main body sides (central side areas) of about 0.043 cm (e.g., about 0.017 inches). Without being bound by theory, it is believed that upon application of sufficient line tension, the retention member is first disengaged from the retention member seat portions at or near the ends of the main body, and that further disengagement of the retention member from the main body side portions of the retention member seat is advantageously propagated or facilitated by such tapered-depth retention seats to provide for a more efficient full disengagement of the retention member. Such retention member seat depth tapering can, for example, be continuous tapering, discontinuous tapering, stepped tapering, combinations thereof, etc, with the advantage being afforded by a method of decreasing the effective retention member seat depth in going from the main body ends to the main body central portions. In embodiments with retention member seats that are raised ridges or the like, the height of the retention member seat (e.g., ridge), the advantage can be afforded by decreasing the effective retention member seat height in going from the main body ends to the main body central portions. Preferable, in such embodiments, the depth of the complementary retention member aspect (e.g., the depth of a complementary retention member groove that conforms to a raised ridge retention member seat) tapers in conformity with the tapered height of the retention member seat (e.g., ridge).

In particular embodiments, the depth (or height in, e.g., raised ridge embodiments) of the retention seat at or near the main body ends is about one-half the thickness or diameter of the material comprising the retention member, and tapers to a depth (or height in, e.g., raised ridge embodiments) at or near the main body sides (central side areas) of about one-quarter the thickness or diameter of the material comprising the retention member.

In embodiments where the resilient line retention member 4 is receivable onto a ridge 7 (e.g., FIGS. 10A, 10B, 11A and 11B), the retention member 4 is preferably receivable onto the ridge 7 to a distance not greater than about one-half the radial width of the resilient member 4, so that at least about half of the member 4 protrudes above the top of the ridge 7. However, according to aspects of the present invention, the extent of receipt of the retention member 4 onto the ridge 7 may vary, so long as the retention member is sufficiently and reversibly retainable upon the ridge 7. FIGS. 10B and 11B show blow-up cross-sectional views of exemplary retention member 4 sections to illustrate that. in these elevated seat or 'ridge' embodiments, the inner surfaces of the retention members provides a complementary aspect that conform to the respective exemplary retention member seats (e.g., rounded and inverted "V"-shaped ridges, respectively). In particular embodiments, the resilient line retention member 4 is elastic or stretchable, and of a size and dimension such that it is stretchably received and retained within the groove 6. In preferred embodiments, the line retention member 4 is annular (e.g., in the form of an o-ring) or equivalent rubber ring, or resilient ring of another elastic material (e.g., plastic, etc.). In particular embodiments, the retention member seat (e.g., groove 6 or ridge 7) is continuous around the exterior surface 14. In alternative embodiments, the retention member seat (e.g., exterior groove 6, or ridge 7) is formed of a plurality of discontinuous seat elements (e.g., repeated finite groove or ridge elements or sections) appropriately disposed around the exterior surface 14 to form a discontinuous seat pattern sufficient to receive and retain the resilient retention member 4. In preferred embodiments (e.g., FIGS. 1, 2, 4, 5A, 5B, 10A, 11A, 12A and 12B) the main body 16 is generally ovoid or ellipsoid, and the retention member seat is a generally elliptical or annular groove 6. However, according to alternate aspects of the present invention, the main body 16, may assume a variety of shapes (e.g., FIGS. 6A-6G) and dimensions. The inventive design allows for essentially any size of main body 16, and the retention member 4 and corresponding seat (e.g., 6 or 7) may assume a variety of sizes, widths, depths, etc., depending on the desired size, shape or design of the indicator main body 16. While essentially any main body size could be made, in preferred aspects for particular fishing situations, the main body 16 length or diameter is from about 0.6 cm to about 7.6 cm (e.g., ¼ to about 3 inches), from about 1.3 cm to about 5.1 cm (e.g., ½ to about 2 inches), from about 0.9 cm to about 3.75 cm (e.g., ⅞ to about 1.5 inches), or from about 2.8 cm to about 0.64 cm (e.g., ⅜ to about 1.25 inches), depending upon the type of application. In preferred aspects the main body length is about 2.7 cm (e.g., about 1 1/16 inches), 2.22 cm (e.g., about ⅞ inches), about 1.74 cm (e.g., about 11/16 inches) and 1.27 cm (e.g., about 0.5 inches), with respective main body widths of about 1.86 cm (e.g., about 0.734 inches), 1.55 cm (e.g., about 0.61 inches), about 1.25 cm (e.g., about 0.49 inches) and 0.99 cm (e.g., about 0.39 inches).

Preferably, and preferably for all embodiments, while the main body portion 16 is buoyant and may be of any suitable material and/or shape, the surface of the main body portion, and particularly that part of the surface adjacent to the retention member seat surface (e.g., at the retention member seat edge or shoulder), is preferably sufficiently rigid (e.g., sufficiently non-deformable or non-compressible) such that during strike-mediated disengagement, the 'moment arm' of leverage, provided by the orientation and position of the edge of the retention member seat with respect to the strike-tensioned line 2 in disengaging the retention member 4, is not lost, decreased or compromised because of compression or deformation of the edge of the retention member seat.

In particular aspects, corresponding retention members 4 are of a dimension to be receivable and retainable within or upon the conforming retention member seats (e.g., 6 or 7) of such preferred main body 16 size ranges (e.g., from about 0.6 cm to about 7.6 cm (e.g., from about ¼ to about 3 inches) in diameter, etc.). Retention member seat (e.g., 6 or 7) design and dimensions reflect the size and shape of the main body 16 and the retention members 4, and sufficiently conform to the retention members 4, so as to operationally reversibly receive and retain the retention members 4. Such seats (e.g., 6 or 7) can be grooves 6, channels or slots, etc., within the main body bodies 16, or can be elevated surfaces or ridges 7 protruding from the main body surface 14, and preferably conform in design and dimension to the main bodies 16 and the retention members 4. Preferred widths (e.g., cross-sectional) for retention members 4 are those that conform to that of the retention member seats. In preferred aspects, retention member cross-sectional widths range from about 0.08 cm to about 0.64 cm (e.g., about 1/32 to about ¼ inches), etc. In particular aspects the retention members consist, or are comprised of elastic, stretchable, resilient material. The dimensions and/or compositions and/or elasticity parameters of such resilient retention members are selected to provide suitable line retention strengths for different types of fishing and fishing situations. Commercially available 'O-rings' are a preferred type of resilient annular retention member 4. However a variety of resilient materials could be used (e.g., rubber washers, elastic bands, rubber bands, etc.), or any material or any structure (resilient or not) that could be reversibly seated and unseated to reversibly retain a line 2 thereunder in operative association with the retention member seat. Preferably, the line-contact surface of the retention member is of a material that sufficiently grips the line (e.g., rubber, soft plastic, etc.) to preclude line slippage while the main body is engaged on a line. The retention members 4 may have a variety of cross-sectional widths and shapes (e.g., circular, ovoid, octagonal, square, rectangular, triangular, etc.), provided that they are reversibly receivable and retainable into or onto the retention member seat (e.g., 6 or 7). Preferable, the retaining member 4 sufficiently conforms in shape to the retention member seat (e.g., 6 or 7) to provide for adequate retention of the line in the retention member seat when the main body is engaged on a line.

In particular embodiments, the line retention member 4 is selected to have sufficient retentive force (offers sufficient resistance to being disengaged from the seat) when engaged within or upon the line retention member seat (e.g., 6 or 7), so as to effectively provide for a 'non-strike-disengageable' strike indicator (i.e., wherein the line is held sufficient tightly between the retention member and seat so that fish strikes and fish 'hook-ups' do not disengage the retention member 4 and indicator 28. Moreover, such 'fixed' line position embodiments are highly useful for particular types of fishing (where a strike-disengageable and/or slidable indicator is not needed), and are nonetheless novel and surprisingly effective by virtue of the instant inventive line-retention means, which nonetheless makes the indictors easily adjustable along a line, and reusable.

In additional aspects, the strike indicator 28, further comprises a fishing line 2 extending through the main body channel 10, the line being reversibly attached to the main body 16 at two points along the line 2 by means of the exterior retaining member seat (e.g., groove 6 or ridge 7) and the retention member 4, wherein the strike indicator 28 is disengagable from the line 2 upon application of sufficient tension to the line 2 (across the two attachment points) and is thereafter slidable (e.g., freely slidable) along the line 2. Therefore, in particular embodiments, the strike indicator 28, further comprises a fishing line extending through the main body channel 10, and, after emerging at the two opposing end openings 8, passing therefrom in, e.g., opposing directions between the retention member 4 and the retention member seat (e.g., passing between the retention member 4 and the external groove 6, or passing between the retention member 4 and the external ridge 7), wherein the strike indicator 28 is thereby reversibly attached at two points along the line 2. The strike indicator 28 is thereby disengagable from the line 2 upon application of sufficient tension to the line 2 (to disengage the retention member 4 from the retention member seat) and is thereafter slidable along the line 2 (see, e.g., FIGS. 5A and 5B).

Figure 1:
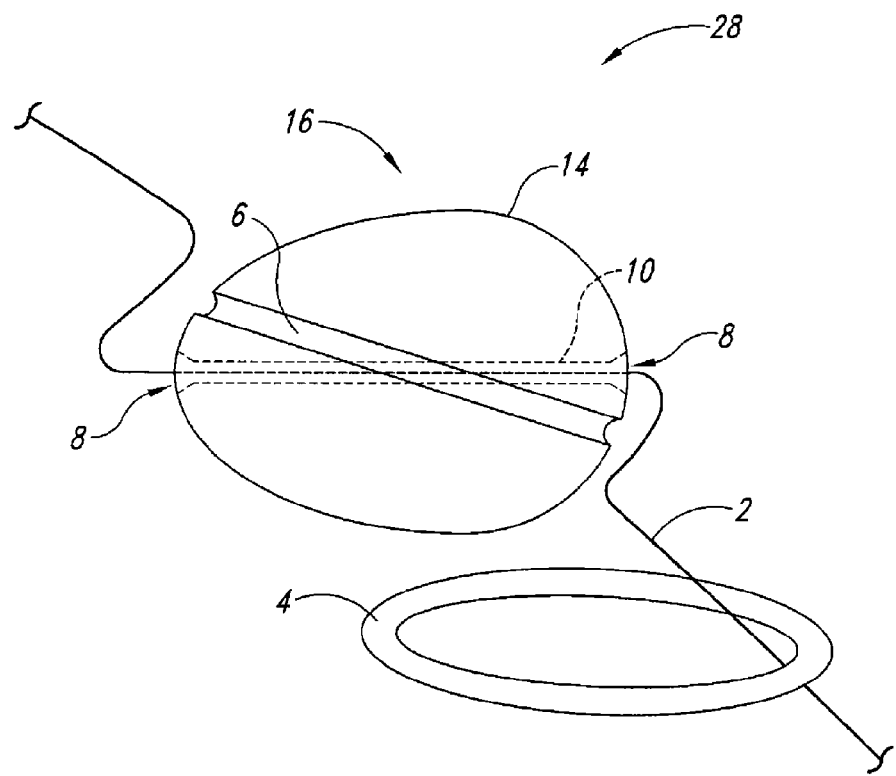
FIG. 1 shows, according to particular aspects of the present invention, a side view of an exemplary disengagable strike indicator embodiment having an axial channel from end to end, an exterior groove within and around the exterior surface that encompasses the channel axis such that channel end openings are disposed on opposite sides of the groove, along with a resilient annular line retention member operative to retain a fishing line passing thereunder at two points within the groove.
Figure 2:
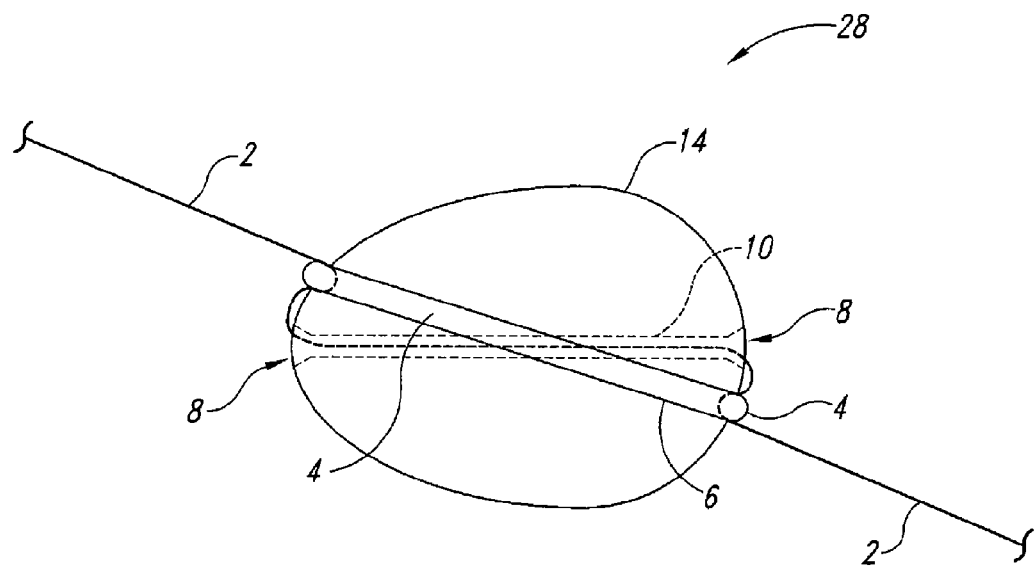
FIG. 2 shows the exemplary disengagable strike indicator embodiment of FIG. 1, wherein the resilient annular line retention member is seated in the exterior groove to retain a fishing line passing thereunder at two points within the groove.

FIG. 2 shows the exemplary disengagable strike indicator embodiment 28 of FIG. 1, wherein the resilient annular line retention member 4 is seated in the exterior groove 6 to retain an exemplary fishing line 2 passing therebetween at two points within the groove 6 (e.g., in this embodiment, positions near and offset from the respective channel end openings 8). In particular embodiments, the resilient retention member 4 is, upon application of sufficient line tension, preferentially displaced onto the line on the rod-proximal (e.g., larger), side of the main body 16 (e.g., on the side of the larger aspect of the ovoid main body 16 as in shown in FIGS. 1, 5B, 10A, 11A), which facilitates retention of the line retention member 4 on the rod-proximal (hook-distal) side of the strike indicator 28 after disengagement thereof from the line 2. Alternately, the resilient retention member 4 is displacable on the side of the smaller or opposite aspect of the main body 16. According to particular aspects, the shape of the indicator main body 16 and the disposition of the retention member seat (e.g., 6 or 7) thereto, can be selected to facilitate displacement of the line retention member to one side or another of the indicator main body upon disengagement (see e.g., FIGS. 1, 5B, 10A, 11A and 6B). In either case, the line retention member 4 is retained around the line 2, and thus operationally retrievable for reuse.

Figure 4:
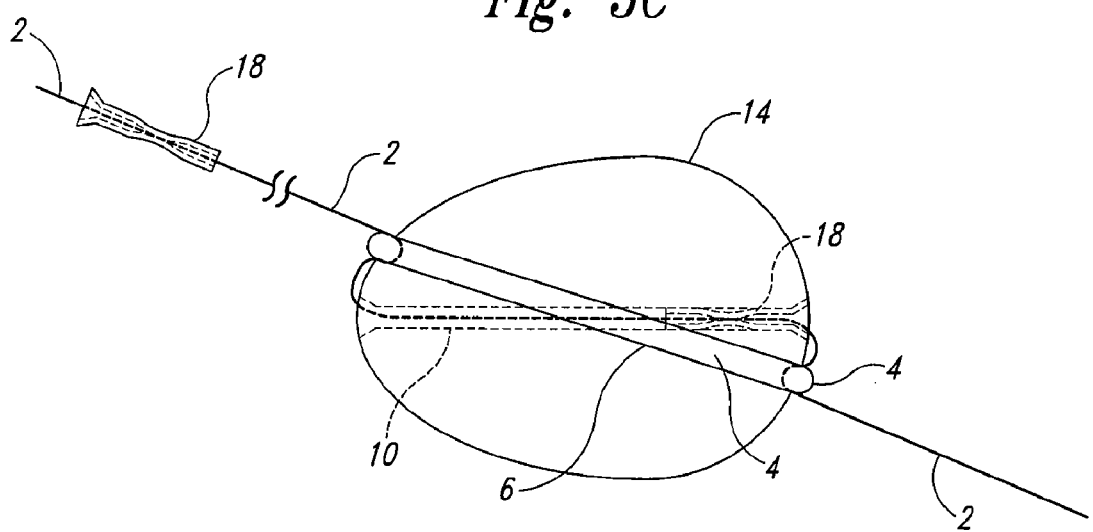
FIG. 4 shows, according to particular aspects, a side view of an exemplary disengagable strike indicator system embodiment having a line stop member engaged therein, and a line stop member located at a remote distance along the line, the two stop members defining a user-selectable range of slidable travel.
Figure 5A:
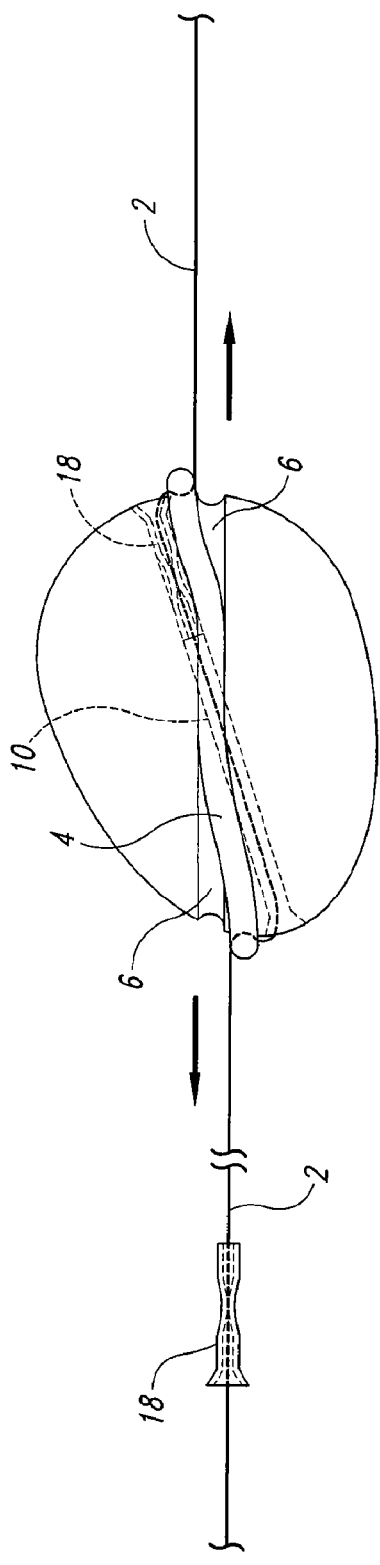
FIGS. 5A and 5B show, according to particular aspects, a side view of an exemplary disengagable strike indicator system embodiment having a line stop member engaged therein (FIG. 5A) to attach the indicator at a user-selected position, and further shows (FIG. 5B) how the annular line retention member is displaceable from the exterior groove of the main body upon application of sufficient line tension (indicated the pair of opposing arrows), which disengages the strike indicators and thereafter allows sliding of the indicator along the line (e.g., between a pair of stop members attached to the line at user-selected positions). Typically, in such embodiments, the resilient retention member is displaced on the side of the larger (or otherwise asymmetric) aspect of a (e.g., ovoid) main body in the rod-proximal direction.
Figure 5B:
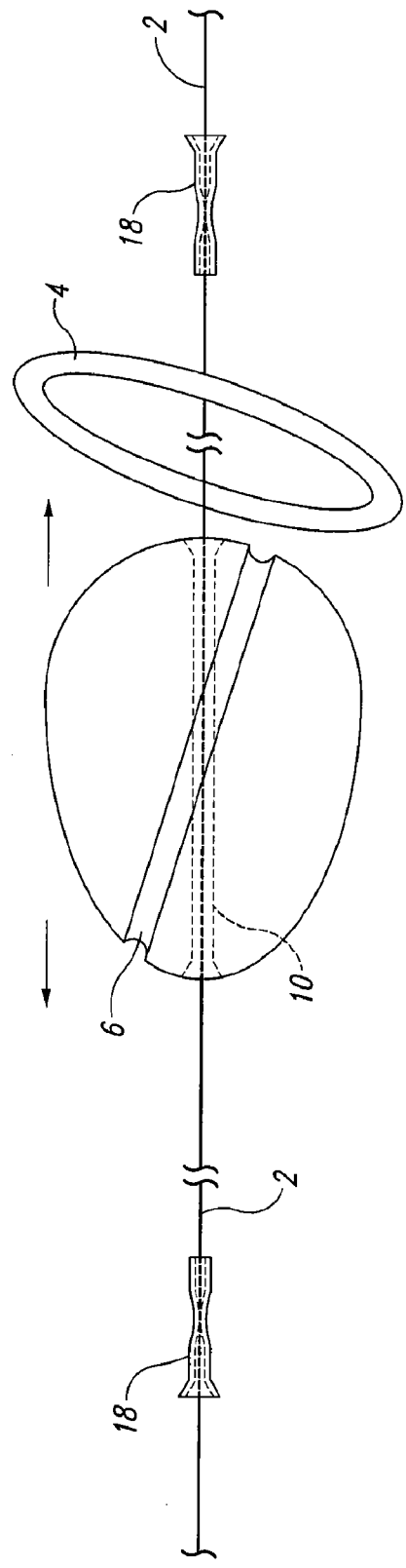
Figure 6A:
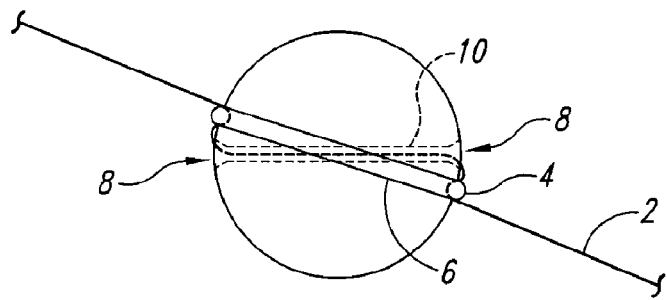
FIGS. 6A-6G show, according to particular aspects, side views of seven additional exemplary disengagable strike indicator embodiments to illustrate that the shape and size of the indicator main body, and the inventive system generally, can assume many different variations.
Figure 6B:
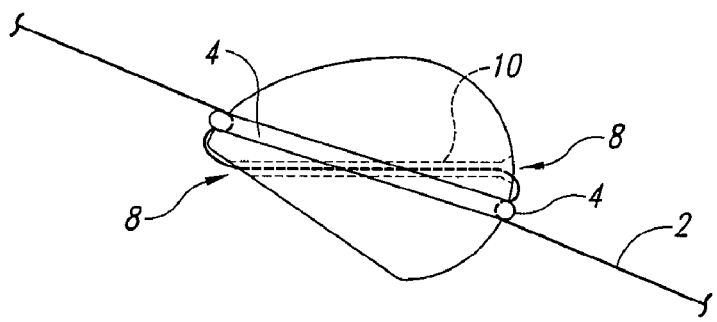
Figure 6C:
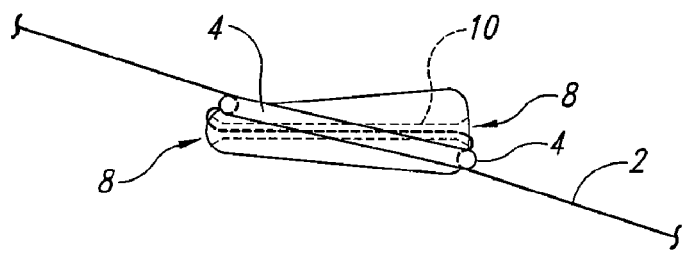
Figure 6D:
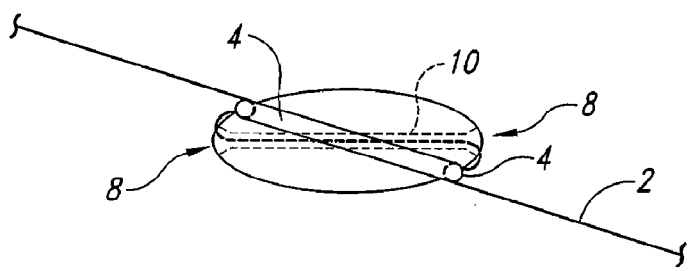
Figure 6E:
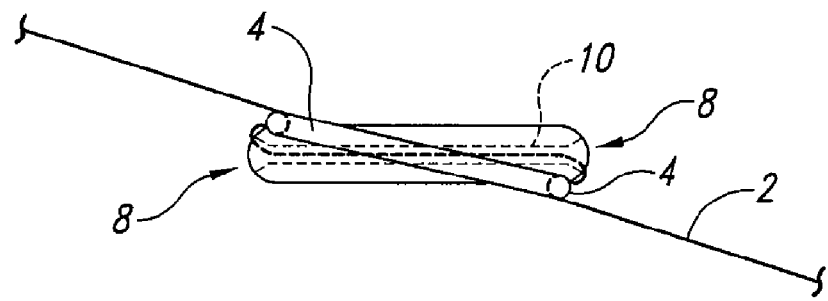
Figure 6F:
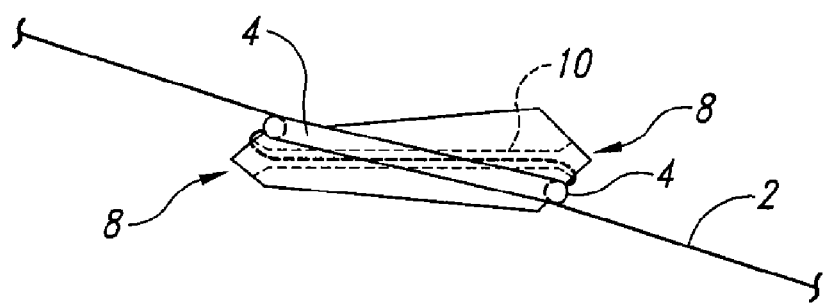
Figure 6G:
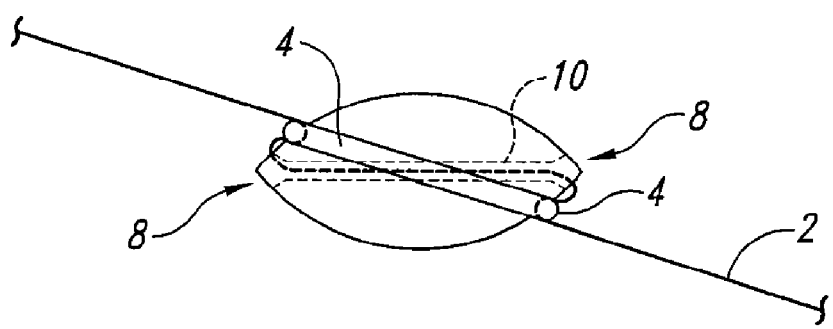
Figure 7:
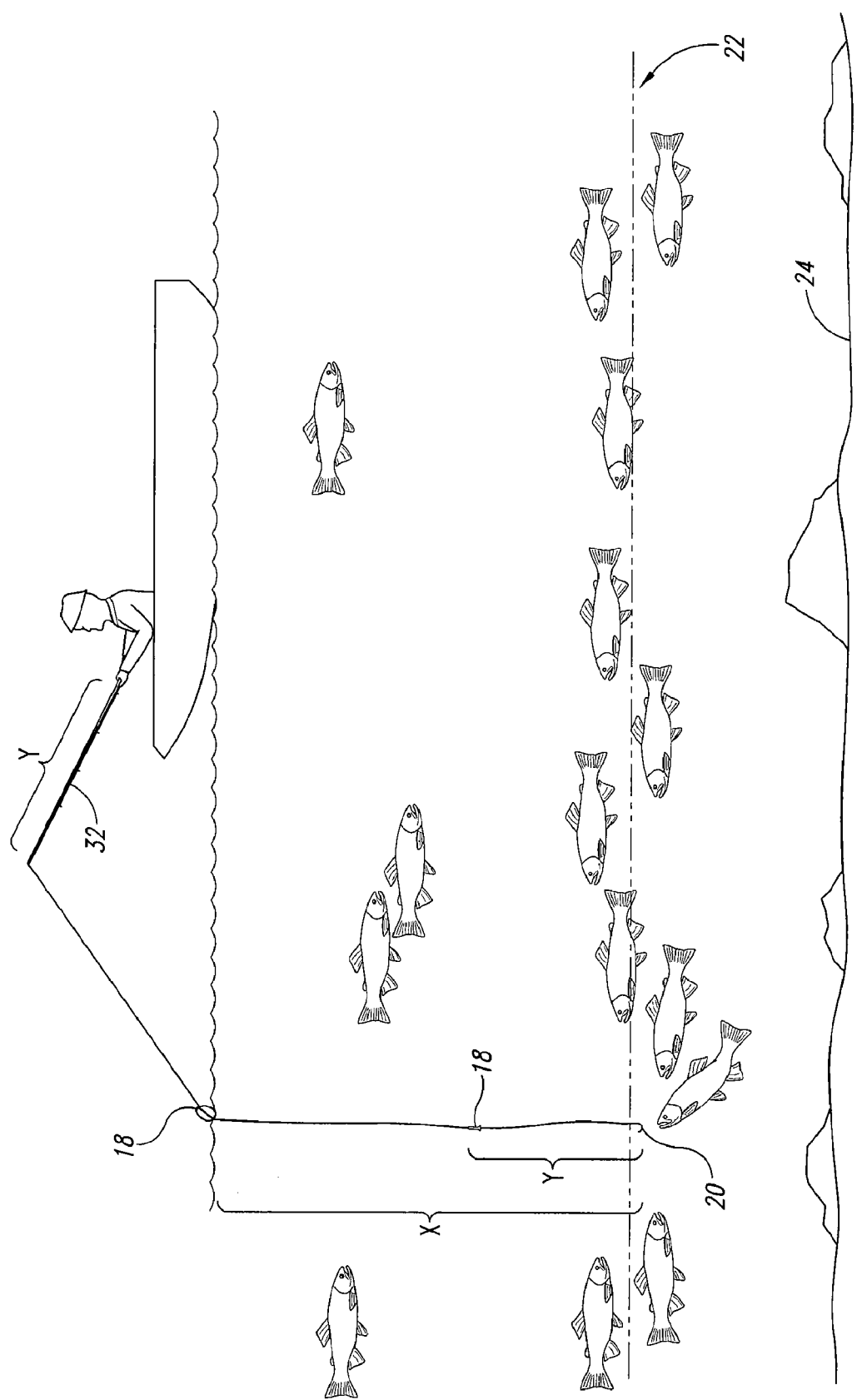
FIG. 7 shows, according to particular aspects, an illustration of an inventive method for fishing with a disengagable and slidable strike indicator at a depth (e.g., 'concentration feeding zone,' or 'holding zone' depth) greater than the length of a fishing rod. The method comprises use of an inventive disengagable strike indicator system, and not only facilitates effective fishing at a consistent user-selected depth, but also facilitates effective and efficient capture of a hooked fish, which in turn enhances the overall fishing experience, and reduces injury to captured fish.
Figure 8A:
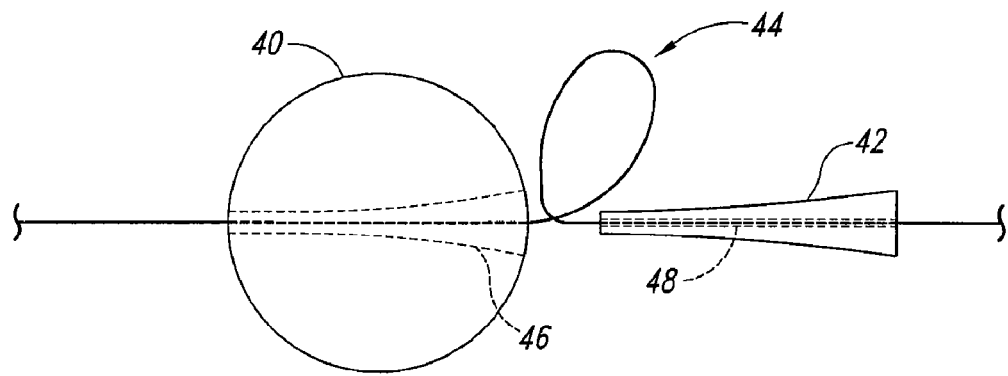
FIGS. 8A and 8B show a prior art quick release strike indicator. With a fish 'hook-up,' tension in the line frees a tippet loop that is wedged between a rubber stopper and the wall of a stopper receiving slot in the indicator body, thereafter allowing the indicator and stopper to freely slide along the fishing line. This indicator, and the substantial drawbacks thereof, are discussed herein above under "Background."
Figure 8B:
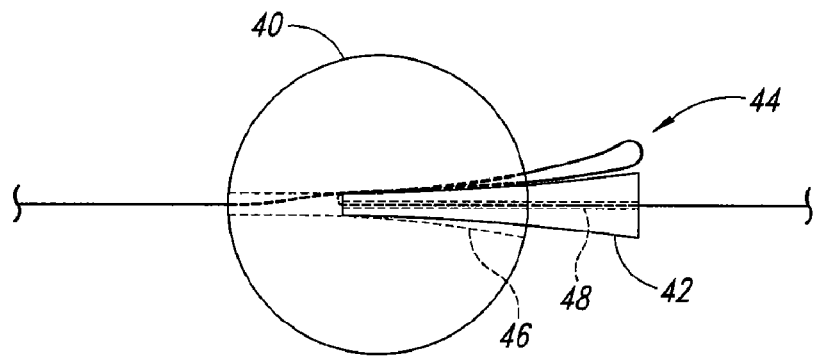
Figure 9:
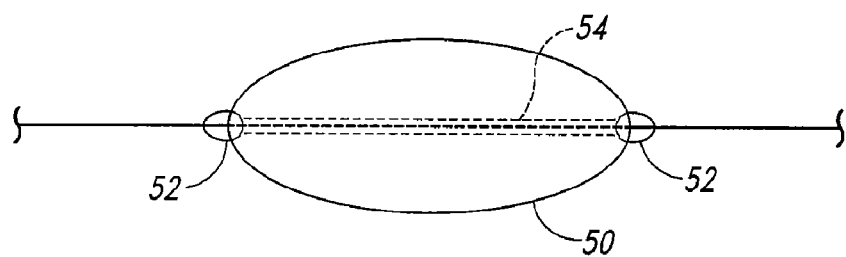
FIG. 9 shows a prior art slidable strike indicator. Elastic positioning retainers enable the indicator to be manually and forcibly repositioned along the leader, while providing sufficient gripping pressure against the leader to maintain its position. This indicator, and the substantial drawbacks thereof, are discussed herein above under "Background."

In other aspects, the retention member can be constructed, or torsionally-loaded so as to predispose disengagement to one side or another of the indicator main body upon disengagement. In preferred embodiments (e.g., in particular, with annular, elastic retention members), the design and/or manner of attaching the indicator main body portion to the line using the line retention member provides for disengaging (upon application of sufficient line tension) the retention member to the rod-proximal side of the indicator body. Preferably, and with reference to FIGS. 4, 5A and 5B for example, to insure that the retention member 4 disengages to the rod-proximal side of a line-mounted main body 14 (as shown in FIGS. 4, 5A and 5B), the retention member (e.g., O-ring) 4 is 'torsionally-loaded' by first engaging and retaining (e.g., by applying pressure using a finger or thumb) one portion of the retention member 4, and the line 2, to be stationary in the hook-proximal area/end of the line retention member seat 6 of the main body 14 (e.g., in the hook-proximal (left side of FIG. 4) end groove area of the retention member seat 6), and then 'rolling' the non-engaged diametrically opposed portion of the retention member 4 along the surface of the main body 14 (e.g., in a direction from left to right along the upper surface of the main body 14 of FIG. 4 for example) to engage and retain the rolled retention member 4 portion and line 2 into the hook-distal portion (right side of FIG. 4) of the line retention member seat 6 of the main body 14 to provide for a torsionally-loaded retained retention member 4 within the retention member seat 6, wherein the line retention member 4 is torsionally-loaded within the line retention member seat 6 by virtue of the retained rolling. The rolling or torsional loading is retained within the seat 6 because, in preferred aspects, the retention member 4 is elastic and sized in its unstretched (unstressed) and unrolled annular diameter to be sufficiently smaller than the corresponding retention member seat 6, such that the retention member 4 must be stressed (stretched) (with or without such rolling) to be retained within the retention member seat 6, resulting in a 'strained'(deformed) seated retention member 4 that is held seated within the retention member by virtue of the 'strain' (elastic, resiliant) forces. Preferably, in the case of asymmetric main bodies 14 (e.g., ovoid, etc) the smaller end of the indicator main body portion 14 is oriented in the hook-proximal orientation (left in FIGS. 4, 5A and 5B), so that the retention member 4 is first retained within the retention member seat 6 at the small main body end, and then rolled along the surface side of the main body 14 and retained in the retention member seat at the larger main body end (right in FIGS. 4, 5A and 5B), to provide for a torsionally-loaded retention member 4.

Without being bound by theory it is believed that in such preferred embodiments, initially retaining a portion of, for example, a circular retention member 4 (and the line 2) to be stationary within the hook-proximal area of the retention member seat 6, followed by rolling a diametrically opposed portion of the retention member 4 along the main body surface toward the hook-distal end of the main body portion 14, and engaging the rolled retention member 4 (and the line 2) therein, provides for a torsionally-loaded retention member 4, wherein the torsional forces (rolled windings) are asymmetrically distributed toward the rod-proximal portions of the retention member 4 and corresponding seat portions. This asymmetrical torsional distribution is believed to facilitate or predispose disengagement (upon application of sufficient line tension) of the retention member 4 to the rod-proximal side of the line-mounted main body portion 14 (as shown in FIG. 5B). Without being bound by theory, it is believed that the asymmetrical torsional distribution decreases the elasticity (or increases the stiffness or modulus of elasticity; e.g., increased Young's modulus) of the retention member 4 in the torsionally-loaded rod-proximal portion of the retention member 4 relative to the hook-proximal portion thereof. With reference to FIG. 5A, upon application of sufficient line-tension, therefore, the relatively elastic hook-proximal portion of the retention member 4 is disengaged from the retention member seat firs, or more easily, and is subsequently and vigorously drawn around the hook-proximal end of the main body 14 and toward the rod-proximal end of the main body 14 as the torsional loading of rod-proximal portion of the retention member 4 (which, during application of such sufficient force, remains engaged in the retention member seat 6 for a longer time relative to the hook-proximal portion thereof) is relieved.

Essentially, therefore, it is believed that such asymmetric torsional loading allows for initial disengagement (from the retention member seat) of the relatively elastic hook-proximal portion of the asymmetrically torsionally-loaded retention member 4 first, whereupon the retention member 'springs' to the rod-proximal side of the main body 14 in relief of the asymmetric torsional loading.

Alternatively, according to further aspects of the present invention, an asymmetric modulus of elasticity or torsional-loading distribution may be created in the construction (e.g., materials, methods) and/or design of the retention member per se (e.g., to obviate the need for 'rolling' or the like to asymmetrically increase the modulus of elasticity). However, rolled, torsionally-loaded embodiments are preferred, because they provide asymmetric torsional loading without the requirement for complex retention member design and/or materials, while nonetheless providing for an efficient, controlled strike-activated disengagement of the retention member from its seat.

Figure 13A:
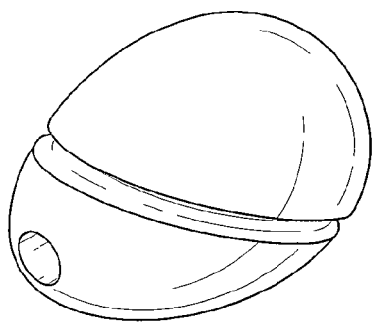
FIGS. 13A-E show a particularly preferred 'tapered-depth' retention member seat embodiment of a disengagable strike indicator 28 for a fishing line.
Figure 13B:
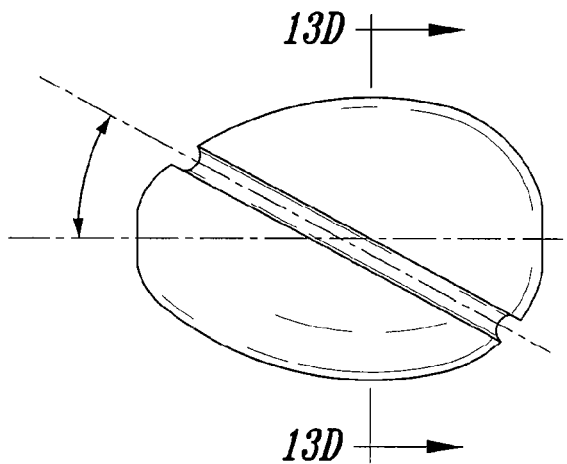
Figure 13C:
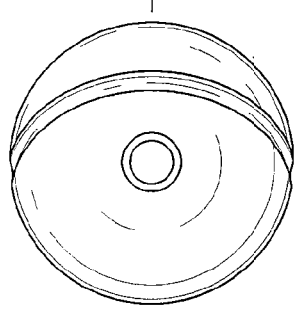
Figure 13D:
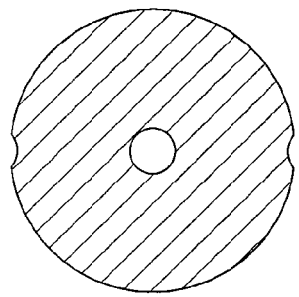
Figure 13E:
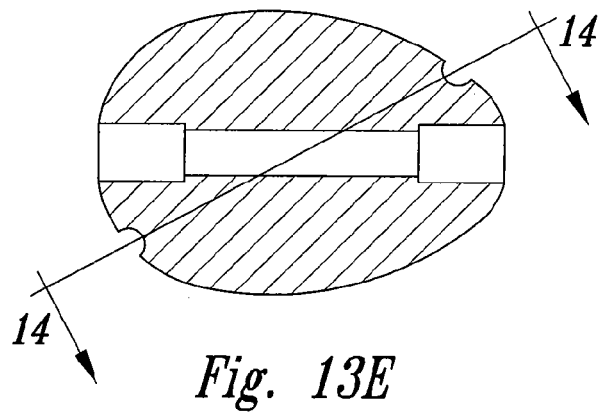
Figure 14:
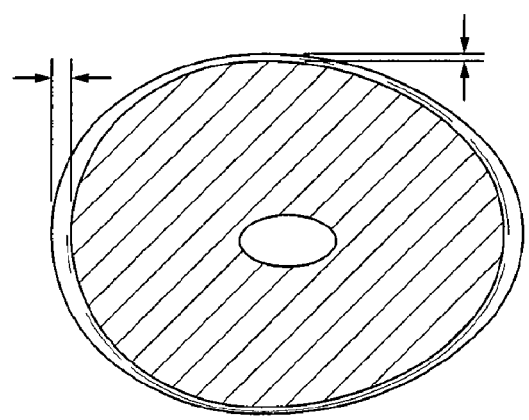
FIG. 14 shows another cross-sectional view of the particularly preferred 'tapered-depth' retention member seat embodiment of a disengagable strike indicator 28 for a fishing line shown in FIGS. 13A-E.

FIGS. 13A-E show a particularly preferred embodiment of a disengagable strike indicator 28 for a fishing line, comprising a buoyant ovoid main body portion 16 having an exterior surface 14, first and second main body ends, and an axial channel 10 therebetween, with corresponding first and second main body end surface openings 8, the channel 10 sufficient to accommodate slidable passage of a fishing line 2 (not shown) therethrough. The main body 16 (e.g., the surface thereof) additionally comprises a line retention member seat 6 (e.g., groove, channel, raised ridge, etc.), which in this embodiment is an annular groove 6, having sides and a bottom, within and around the exterior surface 14, wherein, in this embodiment, a plane defined by the groove 6 intersects the channel 10 axis such that the first and second end surface openings 8 are disposed on opposite sides of the groove 6 (or of the plane defined thereby). In this exemplary embodiment, the main body channel 10 axis intersects a plane defined by the annular retention member seat (e.g., the exterior groove 6) at an acute angle of about 28 degrees (FIG. 13D). Additionally, in this exemplary embodiment, the preferred point of intersection of the main body channel axis with the plane defined by the annular retention member seat is at a position corresponding to the center of the main body channel (FIG. 13 D). FIG. 13B shows exemplary dimensional variables (see TABLE 1 below) for the main body length ("A"), width ("B"), axial channel inner bore diameter ("C"), axial channel outer bore (countersink) diameter ("D"), countersink depth ("E"), and retention seat radius ("R4"). FIG. 14D additionally shows exemplary radius values (radii) for main body surface portions ("R1," "R2" and R3"). Exemplary values for "A," "B," "C," "D," "E," "R1," "R2," "R3" and "R4" are provided in TABLE 1 below:

Offset Axis Channel Embodiments

Figure 15A:
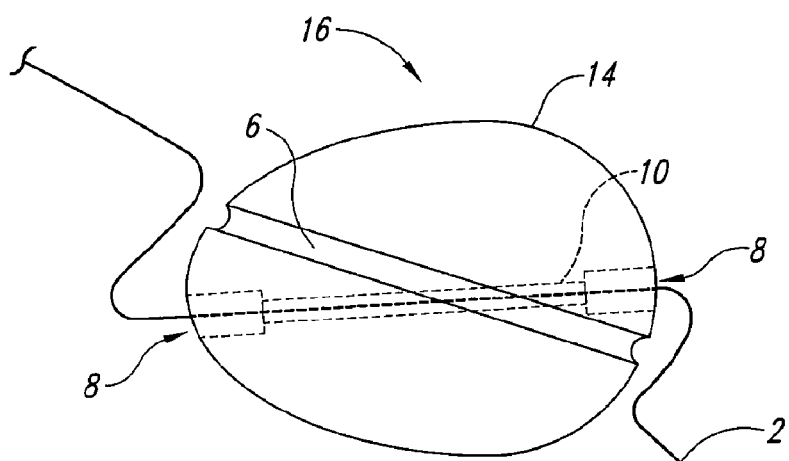
FIGS. 15A and 15B show an alternate 'off-set' bore embodiment of a disengagable strike indicator 28 for a fishing line.
Figure 15B:
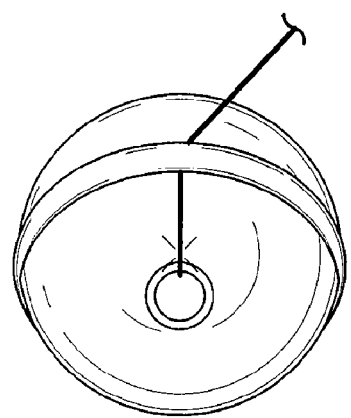

Preferably, the axis of the channel 10 of the main body portion 16 is coincident with the true central axis of the main body portion 16 (see, e.g., FIG. 1). Alternately, however, the axis of the channel 10 of the main body portion 16 is offset (e.g., at one or both channel ends) and/or is at a different angle with respect to the true central axis of the main body portion 16. For example, FIGS. 15A and 15B show an alternate, 'off-set' bore embodiment of a disengagable strike indicator 28 for a fishing line. In the embodiment of FIGS. 15A and B, the axis of the channel 10 of the main body portion 16 is offset from the true center axis at the small aspect end of the ovoid main body portion 16 and also is at a different angle with respect to the true central axis of the main body portion 16. In such embodiments where the actual channel bore is offset from theoretical true main body center axis (cross-hairs in FIG. 15B), e.g., in this embodiment, at the small end of the ovoid (but not at the big end), during strike-mediated disengagement of the line retention member 4, the strike-mediated line tension continues to be applied to the line retention member 4 at the small end, even after the point where the line retention member 4 has reached theoretical true center axis (cross-hairs). Without being bound by theory, this offset feature, and particularly when used in combination with the asymmetric torsional loading of the line retention member 4 as described elsewhere herein, facilitates consistent, reproducible strike-mediated disengagement of the line retention member 4 to the rod-proximal side of the main body portion 16.

Disengagable Strike Indicator System:

With reference to FIGS. 3, 4, 5A, 5B, 7, 12A and 12B, additional aspects provide a disengagable strike indicator system for a fishing line 2 and/or leader or tippet, comprising in addition to the elements and variations of the novel disengagable strike indicator described above, at least one line stop member 18 attachable (e.g., by crimping, adhering, elastic tension, etc.) at a user-selectable fixed position to a fishing line 2 and/or leader or tippet, the line stop member 18 having an outer surface, first and second stop member ends, and an axial stop member channel therebetween, with corresponding first and second stop member end surface openings, wherein the line stop member 18 is receivable into the axial channel 10 of the main body 16, and wherein an aspect of the shape and/or dimension (e.g., flange, or enlarged or extended aspect, etc.) of the line stop member 18 is operative to engage the line stop member 18 when received into the main body channel 10, and is thereby sufficient to preclude travel of a

TABLE 1

Exemplary values, with respect to FIGS. 13A-E, for "A," "B," "C," "D," "E," "R1," "R2," "R3" and "R4"

| | Exemplary Embodiment | | | | | | | | |
|---|---|---|---|---|---|---|---|---|---|
| | A | B | C | D | E | R1 | R2 | R3 | R4 |
| 1 | 2.7 cm (1¹⁄₁₆ inches) | 1.86 cm (0.734 inches) | 0.295 cm (0.116 inches) | 0.381 cm (0.15 inches) | 0.572 cm (0.225 inches) | 0.60 cm (0.236 inches) | 2.21 cm (0.87 inches) | 0.91 cm (0.36 inches) | 0.203 cm (0.08 inches) |
| 2 | 2.22 cm (⅞ inches) | 1.55 cm (0.61 inches) | 0.295 cm (0.116 inches) | 0.381 cm (0.15 inches) | 0.572 cm (0.225 inches) | 0.51 cm (0.2 inches) | 1.83 cm (0.72 inches) | 0.762 cm (0.3 inches) | 0.203 cm (0.08 inches) |
| 3 | 1.74 cm (1¹¹⁄₁₆ inches) | 1.25 cm (0.49 inches) | 0.295 cm (0.116 inches) | 0.381 cm (0.15 inches) | 0.572 cm (0.225 inches) | 0.41 cm (0.16 inches) | 1.47 cm (0.58 inches) | 0.61 cm (0.24 inches) | 0.203 cm (0.08 inches) |
| 4 | 1.27 cm (0.5 inches) | 0.99 cm (0.39 inches) | 0.295 cm (0.116 inches) | 0.381 cm (0.15 inches) | 0.572 cm (0.225 inches) | 0.33 cm (0.13 inches) | 1.17 cm (0.46 inches) | 0.48 cm (0.19 inches) | 0.203 cm (0.08 inches) | disengaged strike indicator beyond a user-selected fixed position where it engages the stop member 18. Such stop members 18 can be of any suitable material (e.g., metal, plastic, elastic material, etc.), and are dimensionally configured so as to be readily passable, upon line retrieval, through line guides of a fishing rod. Preferably, the outer surfaces of such stop members 18 are non-gripping to facilitate separation from the indicator main body channel 10 upon disengagement of the strike indicator 28 from the line 2, and to facilitate unfettered passage through the line guides upon line retrieval past the user-selected position of stop member 18 attachment.

In this embodiment (e.g., FIG. 4), an inventive strike indicator 28 is shown attached to the line 2 at a point where it is engaged with a stop member 18, which has been attached to line 2 at a user-selected position. In particular embodiments, the distance between the stop member 18 ends is less than one-half the distance between the main body ends 8. In additional preferred embodiments, the disengagable strike indicator system comprises two line stop members 18 receivable at opposite ends of the main body 16. Therefore, additional embodiments provide a disengageable strike indicator system (having at least one stop member 18), further comprising a fishing line 2 extending through the main body channel 10 and reversibly attached to the main body at two points along the line 2 by means of the exterior retention member seat (e.g., groove 6) and retention member 4, wherein the strike indicator is disengagable from the line 2 upon application of sufficient tension to the line 2, and is thereafter slidable from or to the attachment position of the at least one line stop member 18. Therefore, in particular embodiments, the strike indicator 28, comprises a fishing line 2 extending through the main body channel 10 and, after emerging at the two opposing main body channel end openings 8, passing therefrom in opposing directions under the retention member 4 within the external seat (e.g., groove 6), wherein the strike indicator is thereby reversibly attached at two points along the line 2, disengagable from the line 2 upon application of sufficient tension to the line 2, and is thereafter slidable to or from the user-selected attachment position of the at least one line stop member 18.

Figure 3A:
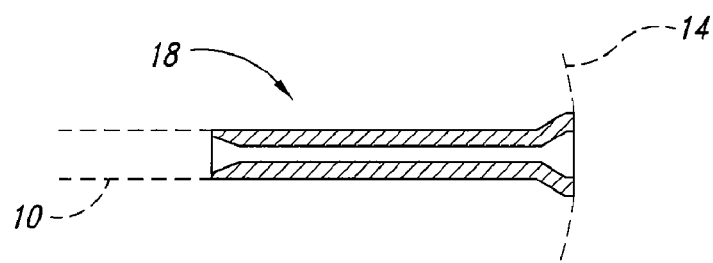
FIGS. 3A, 3B and 3C show, according to particular aspects, side views of three exemplary line stop member embodiments that are attachable to a fishing line at user-selectable positions. The inventive line stop members are receivable into the axial channel of the main body of the inventive disengagable strike indicators to provide for a disengagable strike indicator system, and wherein the shape and/or dimension of the line stop members is operative to engage the line stop member within the main body channel of the inventive strike indicators to limit slidable travel of the disengaged strike indicator along a fishing line. The line stop members, when engaged by the indictor main body, may be flush, recessed, or protruding from the main body surface.
Figure 3B:
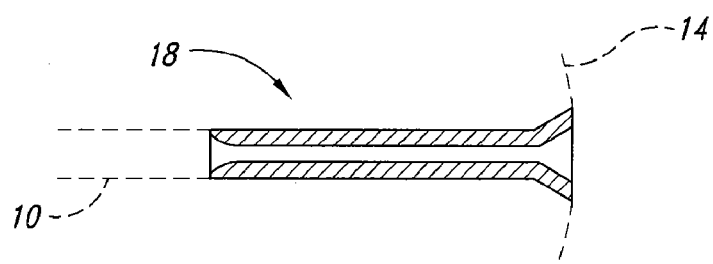
Figure 3C:
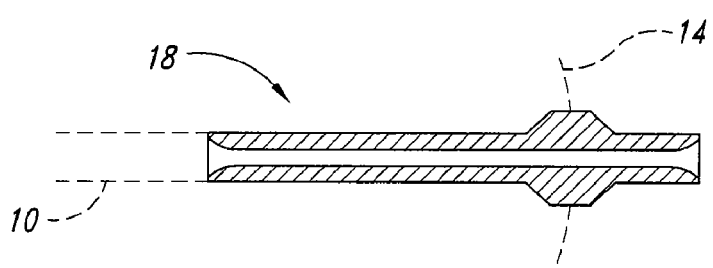

FIGS. 3A, 3B and 3C show side views of three exemplary line stop members 18 attachable to a fishing line 2 at a user-selectable position. The inventive line stop member(s) 18 are receivable into the axial channel 10 of the main body of the inventive disengagable strike indicators (partially shown as dashed lines 14 in the figure) to provide for a disengagable strike indicator system, and the shape and/or dimension of the line stop members 18 is operative to engage the line stop member 18 within the main body channel 10 of the inventive strike indicators to limit slidable travel of the disengaged strike indicator along a fishing line 2. The engagement aspect of the stop member may, for example, correspond to an enlarged portion thereof (e.g., flange, bulge, etc.) that engages a conforming stop member receiving surface of the axial channel 10 (see FIGS. 3A-3C). The line stop members can be of any material that is fixable to the line 2 (e.g., a ductile material that can be pressed, clamped or crimped to be retainable at a fixed point on a line 2 and/or leader or tippet, an elastic member that attaches by means of its inherent dimensional character and elasticity, etc.). Affixing the line stop member to the line may be by any suitable means including but non limited to, crimping of a stop member comprising a ductile material (e.g., metal, plastic, etc.), clamping of a clampable stop member, adhering of a stop member to the line, affixing by inherent elastic means, etc., as long as the stop member is attached to the line in a fixed or effectively fixed, non-slidable (or at least substantially non-slidable) manner, so that the attached stop members serves to effectively preclude slidable travel of the disengaged strike indicator beyond the stop member attachment position. Stop members, may comprise, e.g., on the inner surface thereof, material or structures that preclude or minimize line wear, or materials or structures that facilitate gripping of the line. Encompassed within the scope of the present invention are those stop members that are attached to a line in a manner sufficient, in practical terms depending on the type and nature of the operational fishing, to substantially preclude slidable movement, but nonetheless are positionable along the line with sufficient applied force if repositioning is desired (e.g., tight fitting elastic members for example). Preferably, the stop members are of a ductile metal, and have a non-gripping exterior surface so as not to preclude travel through line guides.

FIG. 4 shows a side view of an exemplary disengagable strike indicator system embodiment having a line stop member 18 engaged therein, so that in operation the strike indicator is engaged at a user-selected position along the line and/or leader or tippet.

FIGS. 5A and 5B show a side view of an exemplary disengagable strike indicator system embodiment having a line stop member 18 engaged therein, and further shows (in going from FIG. 5A to 5B) how the annular line retention member 4 is displaceable from the retention member seat (e.g., exterior groove 6) of the main body 16 upon application of sufficient line tension, which in turn disengages the strike indicator, thereafter allowing sliding of the disengaged strike indicator along the line 2. Typically, in such embodiments, the retention member is displaced on the larger aspect side of the main body (e.g., ovoid), but alternatively, displacement can be on the opposing side of the strike indicator. According to particular aspects, the shape of the indicator main body 16 and the disposition of the retention member seat (e.g., 6 or 7) thereto, can be selected to facilitate displacement of the line retention member to one side or another of the indicator main body upon disengagement (see e.g., FIGS. 1, 4, 5B, 10A, 11A and 6B). In either case, the line retention member 4 is retained around the line 2, and thus operationally retrievable for reuse in the novel disengaging strike indicator system.

Significantly, therefore, the novel, nature, design and methods using the present strike indicators and systems allow for adjustable, consistent (e.g., repeatedly disengagable at the same, or substantially the same line tension value), controlled and reproducible disengagement and reuse in the absence of significant wear, degradation, deformation, etc., of the attachment surfaces and of the line surfaces. Moreover, the inventive strike indicators and systems may be selected to disengage at variety of line tension values, depending upon the conformation, dimension and properties (e.g., size, elastic strength (i.e., tensile elastic modulus), etc.) of the line retention members 4, conformation and dimension of the line retention member seats, and the relational disposition of these aspects with respect to each other and with respect to other aspects of the strike indicator (e.g., relative orientation to axial channel 10; orientation with respect to particular conformational aspects (e.g., asymmetric shape aspects; see, e.g., FIG. 6B) of the main body 16, etc.).

In particular embodiments, the disengagable strike indicator system comprises a first and a second line stop member 18, and further comprises a fishing line 2 (or leader and/or tippet) extending through the main body channel 10 and through a channel of the first stop member 18 engaged therein, the line 2 being reversibly attached to the main body 16 at two points along the line 2 by means of the line retention member seat (e.g., exterior groove 6, raised ridge 7, etc.) and retention member 4, wherein the strike indicator is disengagable from the line 2 upon application of sufficient tension to the line 2 (e.g., tensional stress along the line crossing the two attachment positions) and is thereafter slidable (e.g., from a position of engagement with the first stop member, to the engagement and attachment position of the second line stop member 18 that is positioned along the line a user selectable distance from the position of the first attached strike indicator, and on the side of the strike indicator that is opposite that of the first engaged line stop member 18). Therefore, in particular embodiments, the strike indicator 28, comprises a first and a second line stop member 18, further comprises a fishing line 2 extending through the main body channel 10 and through a channel of the first line stop member 18 engaged therein, and the line 2, after emerging at the two opposing main body channel end openings 8, passing therefrom in opposing directions under the retention member 4 seated on the retention member seat (e.g., the external groove 6, raised ridge 7, etc.), wherein the strike indicator is thereby reversibly attached (e.g., restrained) at two points along the line 2, disengagable from the line 2 upon application of sufficient tension to the line 2 (across the two line restraining positions) and is thereafter slidable to the attachment position of the second line stop member 18 positioned along the line 2 a distance from the attached strike indicator, and on the side of the strike indicator that is opposite that of the first engaged line stop member.

The inventive novel system comprises at least one stop member 18, and is not necessarily limited to any particular disengagable strike indicator design, provided that it is freely slidable on the line 2 once disengaged therefrom. Therefore, general aspects provide a disengagable strike indicator system for a fishing line, comprising: a fishing line 2; a buoyant disegagable strike indicator that is reversibly attachable to, disengagable from and thereafter slidable along a fishing line 2; and at least one strike indicator stop member 18 attachable to a user-selectable position along the fishing line 2, and sufficient, in operation, to limit slidable travel of the disengaged strike indicator along the fishing line 2. Particular general aspects comprise first and second attachable strike indicator stop members 18 attached at different user-selected positions along the fishing line 2, and suitable, in operation of the system, to delimit a slidable range of the disengaged slidable strike indicator along the fishing line. In particular general aspects, the disengagable strike indicator is attached to the line 2 in engagement with the first line stop member attached at a first user-selected line position, and, upon disengagement, the disengaged strike indicator is thereafter slidable along the fishing line 2 between the first and second line stop members 18. In preferred aspects, the strike indicator is disengagable my means of application of sufficient tension to the fishing line (e.g., upon a fish 'hook-up'). Therefore, general aspects of the present invention provide a method of fishing using a disengagable strike indicator system in combination with at least one strike indicator stop member 18.

With reference to FIGS. 4, 5A, 5B and 7, specific embodiments provide a method of fishing (e.g., essentially any type of fishing in any type of water) with a strike indicator at a set depth X (e.g., corresponding to a 'holding zone' or 'concentration feeding zone' 22) greater than the length Y of a fishing rod, comprising: obtaining a fishing line 2 in operable communication with a fishing rod 32, the line 2 extending through rod line guides and from a tip portion of the fishing rod to a fishing hook 20 and retrievable with line retrieving means mounted on the fishing rod 32, the extended line portion having hook-proximal and hook-distal positions. The method further comprises attaching, to the extended line portion, a first and a second strike indicator stop member 18 at a first, hook-distal line stop position corresponding to a desired fishing depth X, and a second, hook-proximal line stop position corresponding to a position of length Y from the hook, and equal to about the length Y of the fishing rod, respectively, wherein the line stop members 18 are receivable into a buoyant disengagable strike indicator 28, and wherein the shape and/or dimensional aspect of the line stop members 18 is operative to engage the line stop member 18 within the buoyant disengagable strike indicator 28. The method additionally comprises attaching, between the two line stop members 18, to the line 2 and in engagement with the first hook-distal stop member 18, a buoyant disegagable fishing line strike indicator 28 reversibly attached to, disengagable from and thereafter slidable along the fishing line 2 between first and second stop members 18, the strike indicator 28 disengagable by application of sufficient line tension. The method further comprises: disengaging the strike indicator 28 by setting the hook into a fish (e.g., a fish 'hook-up'); and retrieving the extended line to a line position corresponding to about that of the second stop member 18, wherein fishing at a depth X greater than the length Y of a fishing rod and yet reaching the hooked fish for effective and efficient retrieval is afforded.

Novel Reversibly Disengagable Line-Stop Members and Systems and Methods Comprising Same:

Additional aspects provide novel line-stop member devices and methods for adjustably and reversibly engaging a line (including, but not limited to fishing lines, ropes, string, cable, wire, cords, etc.) at an engagement position and/or for demarcating one or more positions and/or spans along a line. The inventive line-stop members are reversibly disengagable (or reversibly engagable), and thereby slidably adjustable and positionable along a line, and two such line-stop members can be used to define a user-selectable range or span therebetween.

Further aspects provide novel disengagable strike indicator systems that comprise, in addition to a strike-disengagable or non-strike-disengagable strike indicator, at least one 'reversibly disengagable strike indicator line-stop member' (e.g., as described herein below) that is attachable at a user-selected fixed position along a fishing line, and is engagable with the inventive strike indicator main bodies to limit slidable travel of a disengaged strike indicator along the fishing line, or is additionally or alternatively fixedly engageable with an internal engagement collar of particular inventive strike indicator embodiments to provide for a non-strike-disengagable strike indicator (e.g., an effectively fixed strike indicator).

In preferred embodiments, particular 'dual-use' inventive strike indictor bodies (having an internal engagement collar) can be used for dual purposes as a strike-disengagable (using a line-retention member in the line-retention member seat of the strike indicator main body, and not fixedly engaging the internal engagement collar with the inventive reversibly engagable line-stop member), or non-strike-disengagable (not using a line-retention member, and rather fixedly engaging the internal engagement collar with the inventive reversibly engagable line-stop member) strike indicator.

Further aspects provide novel methods for fishing, comprising fishing with an inventive strike-disengagable or non-strike-disengagable strike indicator with the inventive reversibly disengagable strike indicator line-stop member(s) (e.g., as described herein below), or the inventive strike indicator system.

FIGS. 16A-G, show, according to one exemplary embodiment of the present invention, a novel slide-collar clamping line-stop member. The line-stop member comprises an elongated line-clamping member 60, and an cylindrical engagement collar 72 having collar channel therethrough and slidably positionable along the line-clamping member 60, and suitable and positionable to reversibly hold the line-clamping member 60 in a line-clamping position to engage a line, and suitable and positionable to reversibly disengage the line-clamping member 60 from the line-clamping position to reversibly disengage a line. The surface of the collar may comprise gripping surfaces or texture or be of multi-faceted (e.g., triangular, square, hexagonal, etc.) to provide for better gripping and reversible tightening. The line-clamping member 60 comprises a longitudinal axial bore 80 or channel suitable to allow slidable passage of a line therethrough. The line-clamping member 60 additionally comprises, at one end, at least one pair of line-clamping arms 68 or members each having a collar-stop flange 66 at one end thereof, the line-clamping arms or members operative with the engagement collar 72, and operatively associated and positionable with respect to each other (e.g., by means of at least one hinge or pivot element 64, etc) to allow for clamping a line therebetween to engage a line. The line-clamping member 60 additionally comprises, at the other end, a collar-mounting and retention portion 62, comprising a plurality of spaced, (e.g., resilient) collar-mounting and retention arms 74, each having a retention arm collar-stop flange 76. In particular embodiments, the plurality of collar-mounting and retention arms are spaced or separated by at least one slot 78, the slot suitable to allow for reversibly decreasing (e.g., by compressing the arms toward each other) the distance between the collar-mounting and retention arms to allow for initial mounting and retention (by virtue of the retention arm collar-stop flanges) of the engagement collar 72 on the line-clamping member 60. Situated between the pair of line-clamping arms 68 and the collar-mounting and retention portion 62 is an engagement collar positioning portion 20. The engagement collar positioning portion 20 comprises means to position the engagement collar 72 on the line-clamping member 60. In one aspect, the engagement collar positioning portion 20 allows for engaging a line by positioning the engagement collar 72 on the line-clamping member 60 in a position (e.g., a line-engagement position) that affords operative association with the line-clamping arms 68 or members to allow for clamping a line therebetween. In another aspect, the engagement collar positioning portion 20 allows for disengaging a line by positioning the engagement collar 72 on the line-clamping member 60 in a position (e.g., a line-disengagement position) that precludes operative association with the line-clamping arms 68. In the exemplary embodiment shown, the engagement collar positioning portion 20 comprises a resilient compressible bulge having, in the uncompressed state, an outside diameter larger than the engagement collar channel diameter such that the engagement collar positioning portion 20 must be compressed (e.g., by applying sufficient lateral force with the engagement collar) to reposition the collar between the line-engagement position and the line disengagement position.

FIGS. 17A-M, show, according to another exemplary embodiment of the present invention, a screw-collar clamping line-stop member. The line-stop member comprises an elongated line-clamping member 70, and an cylindrical engagement collar 72 having a collar channel therethrough and positionable along the line-clamping member 70, and suitable and positionable to reversibly hold the line-clamping member 70 in a line-clamping position to engage a line, and suitable and positionable to reversibly disengage the line-clamping member 70 from the line-clamping position to reversibly disengage a line. The surface of the collar may comprise gripping surfaces or texture or be of multi-faceted (e.g., triangular, square, hexagonal, etc.) to provide for better gripping and reversible tightening. The line-clamping member 70 comprises a longitudinal axial bore 78 or channel suitable to allow slidable passage of a line therethrough. The line-clamping member 70 additionally comprises, at one end, at least one pair of line-clamping arms 68 or members each having a collar-stop flange 66 at one end thereof, the line-clamping arms or members operative with the engagement collar 72, and operatively associated and positionable with respect to each other (e.g., by means of at least one hinge or pivot element 64, etc) to allow for clamping a line therebetween to engage a line. The line-clamping member 70 additionally comprises, at the other end, a collar-mounting and retention portion 62, comprising a plurality of spaced, (e.g., resilient) collar-mounting and retention arms 74, each having a retention arm collar-stop flange 76. In particular embodiments, the plurality of collar-mounting and retention arms are spaced or separated by at least one slot 78, the slot suitable to allow for reversibly decreasing (e.g., by compressing the arms toward each other) the distance between the collar-mounting and retention arms to allow for initial mounting and retention (by virtue of the retention arm collar-stop flanges) of the engagement collar 72 on the line-clamping member 70. Situated between the pair of line-clamping arms 68 and the collar-mounting and retention portion 62 is an engagement collar positioning portion 20. The engagement collar positioning portion 20 comprises means to position the engagement collar 72 on the line-clamping member 70. In one aspect, the engagement collar positioning portion 20 allows for engaging a line by positioning the engagement collar 72 on the line-clamping member 70 in a position (e.g., a line-engagement position) that affords operative association with the line-clamping arms 68 or members to allow for clamping a line therebetween. In another aspect, the engagement collar positioning portion 20 allows for disengaging a line by positioning the engagement collar 72 on the line-clamping member 70 in a position (e.g., a line-disengagement position) that precludes operative association with the line-clamping arms 68. In the exemplary embodiment shown, the engagement collar positioning portion 20 comprises thread means complementary to thread means located within the engagement collar channel such that the engagement collar positioning portion 20 must be engaged by screwing the engagement collar thereon between the line-engagement position and the line disengagement position According to preferred aspects of the present invention, the inventive line-stop members can be used as part of a system, in combination with strike-disengagable (as described herein in detail) or non-strike-disengagable strike indicators as described herein below in detail. Moreover, while the above-described inventive reversibly disengagable line-stop members can be designed in essentially any size to accommodate a variety of line types and diameters, in preferred aspects, the inventive line-stop members are designed to be dimensionally compatible for engagement within the axial bores (axial channels) of the strike-disengagable and non-strike-disengagable strike indicators described in detail herein.

As will be appreciated by one of ordinary skill in the art, the inventive line-stop members comprise a line-clamping or line-pinching means in operable association with an engagement collar that is slidable between engagement and disengagement positions, and further comprising an engagement collar retention portion with one or more retention flanges, and while the above-described clamping-arm embodiments illustrate a preferred mode, the line-clamping arms could be replaced with other line-clamping means as long as such means are operatively associated with the engagement collar to provide for reversible engagement. For example, as can be appreciated from FIGS. 16A and 16B, a deformable (e.g., compressible) bulb member or the like can be operative with the collar to provide for line-clamping. Alternatively, a tapered member, hinged or otherwise articulated with the line-stop member and operative with the engagement collar and receivable (upon positioning the engagement collar in the engagement position) into a receiving slot along the line-stop member to provide for clamping pressure on the line is encompassed within the present conception.

Novel Reversibly Disengagable Line-stop Members and Non-Strike-Disengagable Systems and Methods Comprising Same:

Additional preferred embodiments provide novel slidably adjustable non-strike-disengagable strike indicators, comprising a reversibly disengagable line-stop member embodiment as described above in combination with a buoyant strike indicator main body portion having an 'internal engagement member' 24 (e.g., collar, flange, band, ring, notch, etc.) within the main body channel 10 (see, e.g., FIGS. 18A-C and 19A-C). In certain of such preferred aspects, the retention arm collar-stop flange(s) 76 of the collar-mounting and retention portion 62 optionally engage an internal engagement member 24 (e.g., collar, flange, band, ring, notch, etc.) within the main body channel 10 of particular 'dual-use' strike indicator main body embodiments.

Such 'dual-use' inventive strike indictor bodies (having an internal engagement collar) are usable for dual purposes as a strike-disengagable (using a line-retention member 4 in the line-retention member seat 6 of the strike indicator main body, and not fixedly engaging the internal engagement member 24 (e.g., collar) with the inventive reversibly engagable line-stop member), or non-strike-disengagable (not using a line-retention member, and rather fixedly engaging the internal engagement member 24 (e.g., collar) within the channel 10 of the inventive reversibly engagable line-stop member) strike indicator. Alternatively, the inventive reversibly disengagable line-stop members may be used with strike indicator embodiments that do not have a retention member or retention member seat as used herein, provided that such main bodies comprise an internal engagement member (e.g., collar) engagable by the inventive reversibly engagable (reversibly disengagable) line-stop members.

Figure 18A:
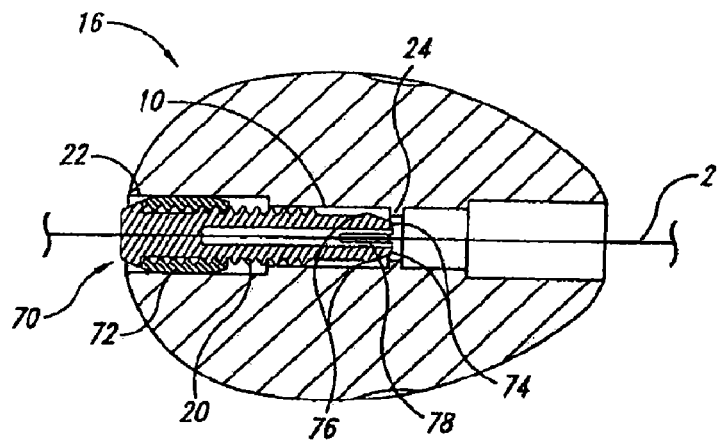
FIGS. 18A-C show, according to yet another exemplary embodiment of the present invention, a screw-collar clamping line-stop member in combination with a strike indicator having an internal engagement collar 24 within the axial channel 10.
Figure 18B:
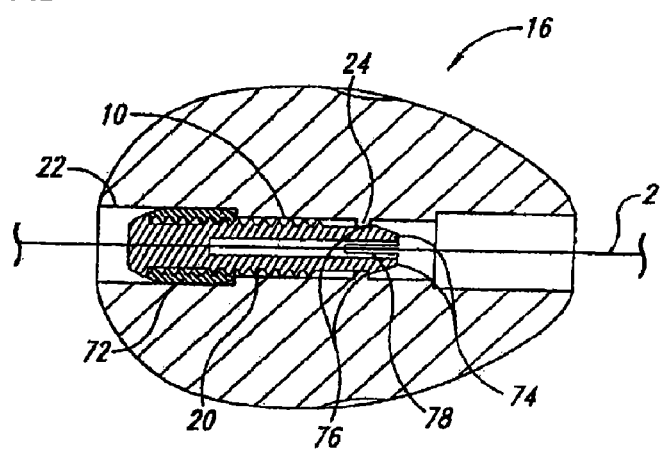
Figure 18C:
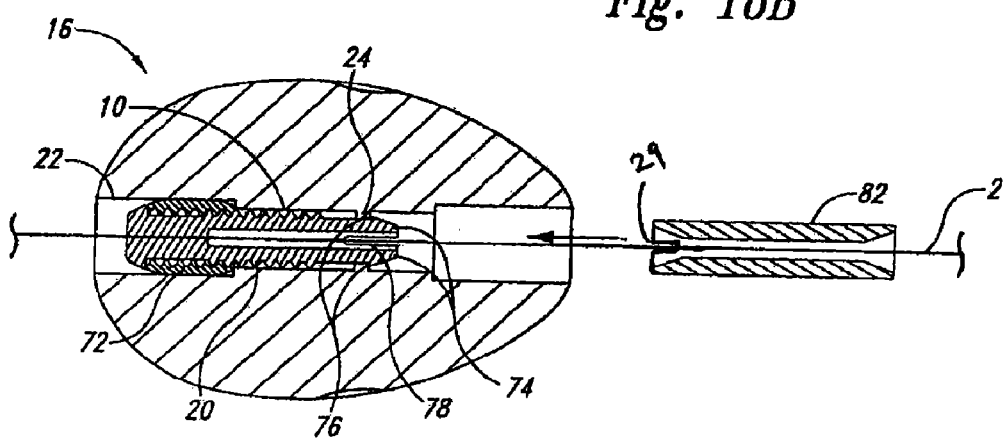

FIGS. 18A-C show, for example, a screw-collar clamping line-stop member (e.g., such as that of FIGS. 17A-D) in combination with a dual-use strike indicator main body portion having an internal engagement collar 24 within the axial channel 10. The line-stop member comprises an elongated line-clamping member 70 having line-clamping arms 68 or members at one end, and a cylindrical engagement collar 72 having a collar channel therethrough and positionable along the line-clamping member 70 and suitable and positionable to reversibly hold the line-clamping member 70 in a line-clamping position to engage a line. The threads may be flattened (e.g., to reduce or avoid wear or stripping of the threads with repeated use). The surface of the collar may comprise gripping surfaces or texture or be of multi-faceted (e.g., triangular, square, hexagonal, etc.) to provide for better gripping and reversible tightening. The line-clamping member 70 additionally comprises, e.g., at the other end, a collar-mounting and retention portion 62, comprising a plurality of spaced, (e.g., resilient) collar-mounting and retention arms 74, each having a retention arm collar-stop flange 76. FIGS. 18A and 18B show the combination before and after, respectively, engagement of the screw-collar clamping line-stop member (e.g., engagement of the retention arm collar-stop flanges 76 thereof) with the internal engagement collar 24. FIGS. 18C and 19C show, according to further aspects, an exemplary tool 82 for disengaging the screw-collar clamping line-stop member (e.g., for disengagement of the retention arm collar-stop flanges 76 thereof) from the internal engagement collar 24. The tool may have an optional line-slit 29 to accommodate the line, and thus preclude pinching or damaging the line, during disengagement of the retention arms 74 from the internal engagement collar 24. In this exemplary embodiment, the internal engagement collar 24 and the counterbores 22 are somewhat asymmetrically configured within the strike indicator main body.

Figure 19A:
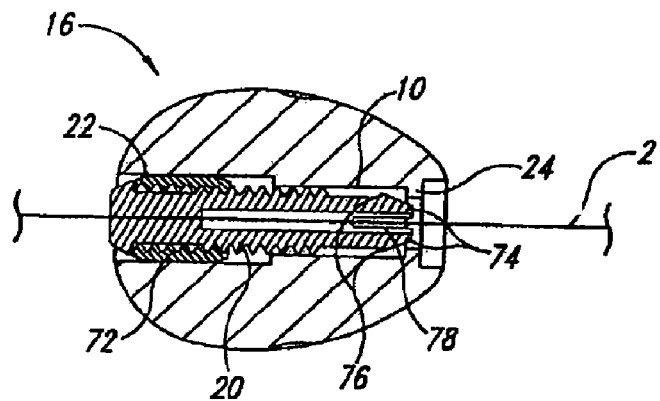
FIGS. 19A-C show, according to additional embodiments, a screw-collar clamping line-stop member in combination with a strike indicator having an internal engagement collar 24 within the axial channel 10.
Figure 19B:
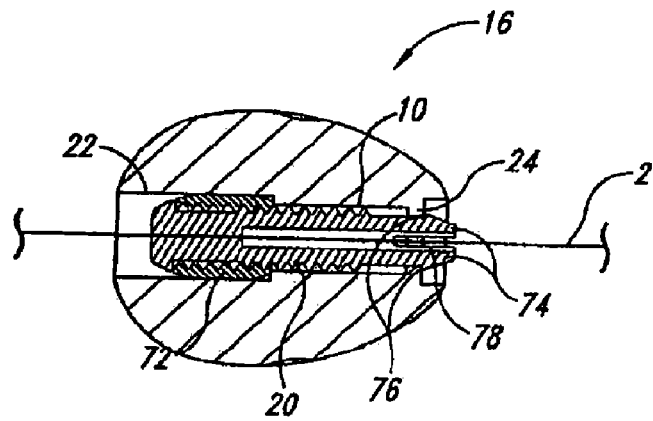
Figure 19C:
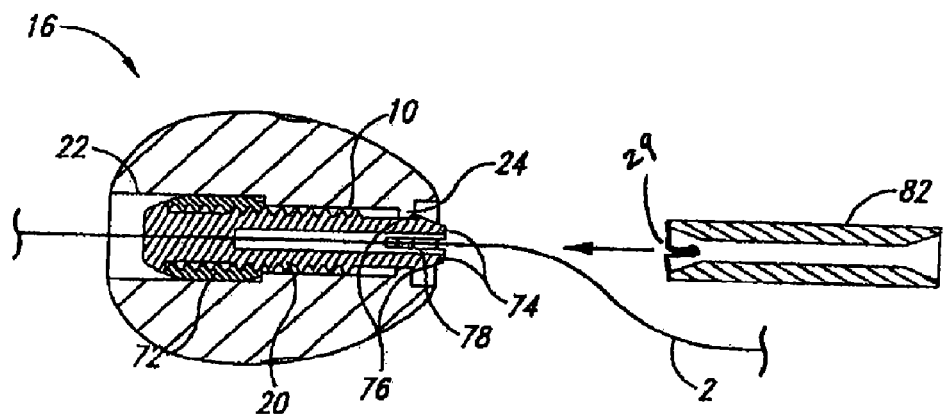

FIGS. 19A-C show, according to additional embodiments, the screw-collar clamping line-stop member of FIGS. 18A-C, in combination with a strike indicator having an internal engagement collar 24 within the axial channel 10. FIGS. 19A and 19B show the combination before and after, respectively, engagement of the screw-collar clamping line-stop member with the internal engagement collar 24 (e.g., before and after engagement of the retention arm collar-stop flanges 76 thereof). FIG. 19C shows, according to further aspects, an exemplary tool 82 for disengaging the screw-collar clamping line-stop member from the internal engagement collar 24. In this exemplary embodiment, the internal engagement collar 24 and the counterbores 22 are significantly asymmetrically configured within the strike indicator main body.

The disengagement tool 82 can be of any design suitable to displace or compress the retention arms 74 and retention arm collar-stop flanges 76 such that they can be removed (disengaged) from the internal engagement collar 24. The exemplary tool shown comprises a funnel shape having an angle and size suitable to compress the retention arms 74 and retention arm collar-stop flanges 76 upon application of the tool to the arms within the channel 10 using sufficient pressure. The tool, for example could be of a variety of shapes (e.g., funnel, cylinder, square, ovoid, rectangular, sizes and/or designs (e.g., compressive shape (e.g., funnel, cylinder, etc.), pliar-type arms, etc., and may be either single-ended or double-ended (as shown herein) or may have more ends. The tool may have the same or different tool sizes or designs on each end thereof. All that is required is that the tool, or some portion thereof can be applied to the retention arms 74 and/or retention arm collar-stop flanges 76 to facilitate disengagement from the internal engagement collar 24. The tool may have an optional line-slit 29 to accommodate the line, and thus preclude pinching or damaging the line, during disengagement of the retention arms 74 from the internal engagement collar 24.

As will be apparent to one of skill in the relevant art, line stop members (e.g., any of those shown herein) can be of any size (e.g., any size that is receivable into a strike indicator main body portion). Preferably, the inventive line-stop members are large enough to facilitate easy handling, engagement, disengagement, adjustment, etc., by a user. Additionally, as will be apparent to one of skill in the relevant art, only one line-stop member (e.g., only one reversibly disengaging line-stop member, or any described herein) is required, according to aspects of the instant invention, to affix a strike indicator main body to a line. This is true regardless of the particular strike indicator main body used, and in the case of 'dual-use' indicator main body portions, regardless of whether the strike indicator main body is being used as a strike-disengagable strike indicator (i.e., using a line-retention member 4 in the line-retention member seat 6 of the strike indicator main body, and not fixedly engaging the internal engagement member 24 (e.g., collar) with the inventive reversibly engagable line-stop member), or as a non-strike-disengagable strike indicator (i.e., not using a line-retention member 4, and rather fixedly engaging the internal engagement member 24 (e.g., collar) within the channel 10 of the inventive reversibly engagable line-stop member). Therefore, there is no requirement that the attributes of the main body channel 10, such as the depth (or even presence) of an opposing (opposite that of the countersink bore used for receiving the initially positioning line-stop member) countersink bore 22, and/or the positioning of the internal engagement member (e.g., collar) within the channel 10 must be symmetrical. That is, the counter bores, if present in a plurality, may be of different diameters, and/or depths, or there may be only a single counterbore 22 at one end of the channel 10. Additionally, the position of the internal engagement member 24 (e.g., collar, flange, band, ring, notch, etc.) may be other than a central position of the channel 10; that is, the internal engagement member may be disposed closer to, at or near one or the other end of the channel 10, for example. Preferably, in small main body portion embodiments (such as that shown in FIGS. 19A-C), the internal engagement member 24 is disposed at or near the end of the channel 10 that is opposite the end receiving the line-stop member. In this way, the size of the line stop-member can be kept sufficiently large to facilitate easy handling by a user, while at the same time enabling use of very small strike indicator main bodies. Thus, while preferred embodiments of the inventive strike indicator main bodies have a channel 10 and at least one counterbore 22 at one end, there is no requirement for an opposing counterbore, and even if such an opposing counterbore is present, there is no requirement that the diameter and/or depth of such opposing counterbore is the same as that of the opposed counterbore. In certain 'system' embodiments described herein comprising two stop members (e.g., a rod-proximal line-stop member, and a hook-proximal line-stop member), where a main body is slidable therebetween, all that is really required is that the line-stop members (e.g., the hook-proximal line-stop member) be able to engage, and/or limit slidable travel of the main body portion with respect to the line attachment position of the line-stop member.

Modular Accessory Attachment Member Embodiments:

In particular embodiments, as described in detail herein above, the inventive line-stop members are insertable, attachable, engageable, etc., with and/or into a strike indicator or other buoyant flotation member to provide for a strike indicator system, and method of using same.

In additional embodiments, the inventive line-stop members are insertable, attachable, engageable, etc., with and/or into other objects or elements that are desired to be operatively or spatially associated with the line via the line-stop member. For example, in certain embodiments, the surface of the engagement collar, or other accessible surface of the line-stop member, comprises at least one attachment means (e.g., at least one hook, loop, eye, snap, pin, clasp swivel, clevis clip, etc) to provide for attaching one or more additional objects (e.g., line, swivel member, blade member, weight or sinker, float member, etc.) to the line-stop member. In particular line-stop member embodiments (see, e.g., FIG. 16G), the attachment means comprises an accessory collar 28 that attaches to the line stop member (e.g., to the 'collar mounting and retention portion,' as defined herein, of the line-stop member). Preferably the accessory collar 28 is rotatably attached to the line-stop member so that the collar (and anything attached to the attachment means of the collar) is free to rotate about the line-stop member (e.g., about the longitudinal axis thereof). The accessory collar 28 comprises at least one attachment means (e.g., 26 or 27) on its surface (e.g., at least one hook, loop, eye, snap, pin, clasp swivel, clevis clip, etc) to provide for attaching one or more additional objects (e.g., line, swivel member, blade member, weight or sinker, float member, etc.) to the line-stop member.

The inventive line-stop members, therefore, not only have utility for engaging and/or demarcating one or more positions and/or spans along a line, rope, etc., and for attaching to strike indicators, but also have substantial utility for attaching to essentially anything that is desired to be brought in operable and/or spatial association with a line, rope, etc.

The invention claimed is:

1. A reversibly disengagable line-stop member, comprising:
   an elongated line-clamping member having, at a line-clamping end, a plurality of line-clamping arms each with a line-gripping surface, at least one of said line-clamping arms having a line-clamping arm collar-stop element, the elongated line-clamping member having, at an opposing collar-mounting and retention end, a collar-mounting and retention portion having a retention portion collar-stop element, the elongated line clamping member having a longitudinal axial bore or channel suitable to allow slidable passage of a line therethrough;
   an engagement collar having an engagement collar channel therethrough and positionable along the line-clamping member, the engagement collar positionable in a line-engagement position to operatively and reversibly hold the plurality of line-clamping arms in a line-clamping or line-engagement position sufficient for fixedly engaging a line between a respective plurality of the line-gripping surfaces, and additionally positionable in a line-disengagement position to operatively and reversibly disengage the line from the respective plurality of line gripping surfaces; and
   an engagement collar positioning portion disposed between the line-clamping arm collar-stop element and the retention portion collar-stop element, the engagement collar positioning portion comprising means to reversibly position and retain the engagement collar on the line-clamping member in the line-engagement position, or in the line-disengagement position, wherein the retention portion collar-stop element is configured to delimit positioning of the engagement collar to preclude separation thereof from the elongated line-clamping member when the engagement collar is in the line-disengagement position, and wherein the line-clamping member is fixedly repositionable along a line.

2. The line-stop member of claim 1, wherein the line-clamping member comprises at least two line-clamping arms, at least one of which comprises a collar-stop element or flange to delimit positioning of the engagement collar.

3. The line-stop member of claim 1, wherein the collar-mounting and retention portion comprises one or a plurality of collar-mounting and retention arms, at least one of which comprising a retention arm collar-stop element or flange to delimit positioning of the engagement collar.

4. The line-stop member of claim 3, wherein the one or a plurality of collar-mounting and retention arms comprises a tapered or ramped configuration to provide for enhanced line-clamping force as the engagement collar is progressively brought into operative association with the line-clamping arms.

5. The line-stop member of claim 1, wherein the engagement collar comprises a cylindrical engagement collar having a textured exterior surface.

6. The line-stop member of claim 1, wherein the engagement collar positioning portion comprises a resilient compressible portion having, in the uncompressed state, an outside diameter larger than the engagement collar channel diameter such that the engagement collar positioning portion must be compressed to reposition the collar between the line-engagement position and the line disengagement position.

7. The line-stop member of claim 1, wherein the engagement collar positioning portion comprises thread means complementary to thread means located within the engagement collar channel such that the engagement collar positioning portion is engageable by screwing the engagement collar thereon between the line-engagement position and the line disengagement position.

8. The line-stop member of claim 1, further comprising accessory attachment means for attachment of an additional object or element to the line-stop member to provide for operative or spatial association of said additional object or element with a line.

9. The line-stop member of claim 8, wherein the accessory attachment means is present on the exterior surface of the engagement collar.

10. The line-stop member of claim 8, wherein the accessory attachment means comprises an accessory attachment collar having an accessory collar channel therethrough, the accessory collar attaching to the line stop member.

11. The line-stop member of claim 10, wherein the accessory attachment collar reversibly attaches to, around or partially around the collar mounting and retention portion of the line-stop member.

12. The line-stop member of claim 10, wherein the accessory collar is rotatably attachable to the collar mounting and retention portion of the line-stop member so that the collar and anything attached to the attachment means thereof is free to rotate about the longitudinal axis of the line-stop member.

13. The line-stop member of claim 10, wherein the accessory collar comprises line access means to allow for lateral insertion of a line into the channel of the accessory collar.

\* \* \* \* \*